(12) United States Patent
Otani et al.

(10) Patent No.: US 12,099,209 B2
(45) Date of Patent: Sep. 24, 2024

(54) PROJECTION-IMAGE-DISPLAYING LAMINATE FILM, PROJECTION-IMAGE-DISPLAYING LAMINATED GLASS, AND IMAGE DISPLAY SYSTEM

(71) Applicant: FUJIFILM Corporation, Tokyo (JP)

(72) Inventors: Taketo Otani, Minamiashigara (JP); Shusuke Arita, Minamiashigara (JP); Makoto Uchimura, Minamiashigara (JP); Yujiro Yanai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 526 days.

(21) Appl. No.: 17/464,840

(22) Filed: Sep. 2, 2021

(65) Prior Publication Data

US 2021/0397011 A1     Dec. 23, 2021

Related U.S. Application Data

(63) Continuation of application No. PCT/JP2020/008919, filed on Mar. 3, 2020.

(30) Foreign Application Priority Data

Mar. 6, 2019  (JP) .................................. 2019-040484
Sep. 27, 2019  (JP) .................................. 2019-177867
Oct. 21, 2019  (JP) .................................. 2019-191993

(51) Int. Cl.
*G02B 27/18*   (2006.01)
*B32B 17/10*   (2006.01)
(Continued)

(52) U.S. Cl.
CPC .............. *G02B 27/18* (2013.01); *B32B 17/10* (2013.01); *B32B 17/10036* (2013.01);
(Continued)

(58) Field of Classification Search
CPC .... G02B 27/18; G02B 27/0101; B32B 17/10; B32B 17/10036; B32B 17/10504
(Continued)

(56) References Cited

U.S. PATENT DOCUMENTS

2017/0059749 A1   3/2017  Wakatsuki et al.
2019/0072766 A1   3/2019  Anzai

FOREIGN PATENT DOCUMENTS

CN         107814476 A       3/2018
WO    WO 2009/069799 A1      6/2009
(Continued)

OTHER PUBLICATIONS

"Coefficient of friction," Encyclopaedia Britannica, Inc., Jun. 24, 2020, retreived from https://www.britannica.com/science/coefficient-of-friction, pp. 1-2.
(Continued)

*Primary Examiner* — Jerry L Brooks
(74) *Attorney, Agent, or Firm* — Birch, Stewart, Kolasch & Birch, LLP

(57) ABSTRACT

Objects are to provide a projection-image-displaying laminate film that enables, when used for, for example, a HUD, displaying of undistorted projection images of high-quality screen images, a laminated glass using the projection-image-displaying laminate film, and an image display system using the laminated glass. The objects are achieved with a projection-image-displaying laminate film including a half-mirror film including a selective reflection layer configured to wavelength-selectively reflect light, and a heat-sealing layer disposed on one surface of the half-mirror film, wherein the half-mirror film has a stiffness at 25° C. of 4.0 N·mm or less, and the heat-sealing layer has a thickness of 40 μm or less, contains a thermoplastic resin, and has a
(Continued)

surface opposite from the half-mirror film, the surface having a static coefficient of friction of 1.0 or less.

19 Claims, 1 Drawing Sheet

(51) Int. Cl.
*B60K 35/00* (2024.01)
*B60K 35/23* (2024.01)
*G02B 27/01* (2006.01)

(52) U.S. Cl.
CPC .. *B32B 17/10504* (2013.01); *B32B 17/10614* (2013.01); *B32B 17/10761* (2013.01); *B60K 35/00* (2013.01); *G02B 27/0101* (2013.01); *B32B 2264/10* (2013.01); *B32B 2264/301* (2020.08); *B32B 2264/302* (2020.08); *B32B 2307/31* (2013.01); *B32B 2307/416* (2013.01); *B32B 2307/42* (2013.01); *B32B 2307/546* (2013.01); *B32B 2307/732* (2013.01); *B32B 2457/202* (2013.01); *B32B 2551/08* (2013.01); *B32B 2605/006* (2013.01); *B60K 35/23* (2024.01); *B60K 2360/23* (2024.01); *G02B 2027/0194* (2013.01)

(58) Field of Classification Search
USPC .......................................... 359/630
See application file for complete search history.

(56) References Cited

FOREIGN PATENT DOCUMENTS

| WO | WO 2016/052367 A1 | 4/2016 |
| WO | WO 2017/212755 A1 | 12/2017 |
| WO | WO-2018110066 A1 * | 6/2018 |
| WO | WO 2019/050019 A1 | 3/2019 |

OTHER PUBLICATIONS

Extended European Search Report for corresponding European Application No. 20767141.3, dated Apr. 7, 2022.
Chinese Office Action and Search Report for Chinese Application No. 202080018223.4, dated Dec. 5, 2022.
International Preliminary Report on Patentability and Written Opinion of the International Searching Authority for International Application No. PCT/JP2020/008919, dated Sep. 16, 2021, with an English translation.
International Search Report for International Application No. PCT/JP2020/008919, dated Jun. 9, 2020.

* cited by examiner

PROJECTION-IMAGE-DISPLAYING LAMINATE FILM, PROJECTION-IMAGE-DISPLAYING LAMINATED GLASS, AND IMAGE DISPLAY SYSTEM

CROSS-REFERENCE TO RELATED APPLICATIONS

This application is a Continuation of PCT International Application No. PCT/JP2020/008919 filed on Mar. 3, 2020, which claims priority under 35 U.S.C. § 119(a) to Japanese Patent Application No. 2019-040484 filed on Mar. 6, 2019, Japanese Patent Application No. 2019-177867 filed on Sep. 27, 2019 and Japanese Patent Application No. 2019-191993 filed on Oct. 21, 2019. Each of the above applications is hereby expressly incorporated by reference, in its entirety, into the present application.

BACKGROUND OF THE INVENTION

1. Field of the Invention

The present invention relates to a projection-image-displaying laminate film, a projection-image-displaying laminated glass, and an image display system.

2. Description of the Related Art

The laminated glass used for, for example, the windshield of an automobile can be provided to include a half-mirror film therein, so that the half-mirror film (laminated glass) can be used as a projection-image-displaying member for a head-up display system.

For example, WO2016/052367A discloses that a half-mirror film including a retardation layer and a plurality of cholesteric liquid crystal layers is used as a projection-image-displaying member for a head-up display system mounted on an automobile. In general, the laminated glass for an automobile has an intermediate film disposed between two glass plates. WO2016/052367A states that, in a windshield glass having such a laminated-glass configuration, a half-mirror film is disposed on an intermediate film.

SUMMARY OF THE INVENTION

In general, in the case of using a half-mirror film as a projection-image-displaying member of a head-up display system, the half-mirror film sandwiched between two intermediate films is sandwiched between two glass plates to form a laminated glass.

However, when the existing half-mirror film is disposed within such a laminated glass and used as a projection-image-displaying member, the projection images are distorted and the projection images have poor visibility, which is problematic.

In order to address such a problem, a purpose of the present invention, namely, an object of the present invention is to provide, in the case of using a half-mirror film disposed within a laminated glass, for a projection-image display device such as a head-up display system, a projection-image-displaying laminate film that enables undistorted and highly visible projection of screen images; a laminated glass using this projection-image-displaying film; and an image display system.

The inventors of the present invention performed thorough studies and, as a result, have found that, in the case of disposing a half-mirror film within a laminated glass to provide a projection-image-displaying member for a head-up display system, the distortion of the projection images is caused by of wrinkles of the half-mirror film.

Furthermore, the inventors of the present invention performed thorough studies and, as a result, have found the following: in order to prevent wrinkles of the half-mirror film to achieve undistorted and highly visible projection of screen images, it is important that the half-mirror film has a sufficiently low stiffness, the half-mirror film is placed so as to conform to a glass surface to keep smoothness, and the member including the half-mirror film has sufficient lubricity over a glass surface; when these conditions are satisfied, formation of wrinkles in the half-mirror film is suppressed, to achieve a projection-image-displaying laminated glass that provides highly visible projection images not having unevenness.

Specifically, the present invention relates to the invention having the following features.

[1] A projection-image-displaying laminate film including a half-mirror film including a selective reflection layer configured to wavelength-selectively reflect light, and a heat-sealing layer disposed on one of surfaces of the half-mirror film,
   wherein the half-mirror film has a stiffness at 25° C. of 4.0 N·mm or less, and
   the heat-sealing layer has a thickness of 40 µm or less, contains a thermoplastic resin, and has a surface opposite from the half-mirror film, the surface having a static coefficient of friction of 1.0 or less.

[2] The projection-image-displaying laminate film according to [1], wherein the half-mirror film has a stiffness of 1.0 N·mm or less.

[3] The projection-image-displaying laminate film according to [1] or [2], wherein the heat-sealing layer has a thickness of 10 µm or less.

[4] The projection-image-displaying laminate film according to any one of [1] to [3], wherein the heat-sealing layer includes a polyvinyl acetal resin.

[5] The projection-image-displaying laminate film according to any one of [1] to [4], wherein the heat-sealing layer contains fine particles having an average primary particle size of 5 to 380 nm.

[6] The projection-image-displaying laminate film according to any one of [1] to [4], wherein the heat-sealing layer contains fine particles forming secondary particles that are aggregates of primary particles, and
   the primary particles have an average particle size of 5 to 50 nm, and the secondary particles have an average particle size of 50 to 380 nm.

[7] The projection-image-displaying laminate film according to [5] or [6], wherein the heat-sealing layer contains 3 to 30 mass % of the fine particles.

[8] A projection-image-displaying laminated glass, wherein a laminate including the projection-image-displaying laminate film according to any one of [1] to [7] and an intermediate film adjacent to the selective reflection layer of the projection-image-displaying laminate film is sandwiched between two glass plates.

[9] An image display system, wherein, onto the projection-image-displaying laminated glass according to [8], a screen image is projected from a light source configured to emit p-polarized light.

The present invention enables, in displaying of projection images in, for example, a head-up display system using, as a projection-image-displaying member, a half-mirror film, undistorted and highly visible projection of screen images.

DESCRIPTION OF THE PREFERRED EMBODIMENTS

Figure 1:
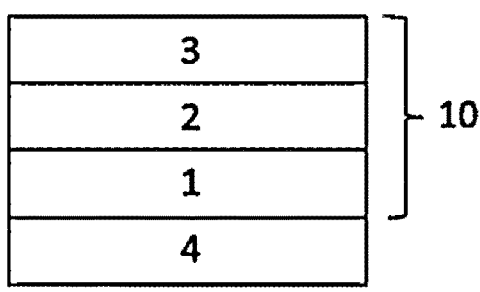
FIG. 1 is a schematic view illustrating an example of a projection-image-displaying laminate film according to the present invention.

Hereinafter, the present invention will be described in detail.

In this Specification, "a value 'to' another value" used is intended to include the value and the other value respectively as the lower-limit value and the upper-limit value.

In this Specification, angles (angles such as "90°") and angular relations (such as "parallel", "horizontal", and "vertical") include a margin of error allowable in the technical field to which the present invention belongs. For example, such an angle or the like is meant to be in the range of the exact angle ±less than 10°, and the error from the exact angle is preferably 5° or less, more preferably 3° or less.

In this Specification, when circularly polarized light is described as being "selective", the amount of light of the right-circularly polarized component or the left-circularly polarized component of light is larger than that of the other circularly polarized component. Specifically, in the case of being described as being "selective", the degree of circular polarization of the light is preferably 0.3 or more, more preferably 0.6 or more, still more preferably 0.8 or more. Particularly preferably, the degree of circular polarization of the light is substantially 1.0. The degree of circular polarization is a value defined by $|I_R-I_L|/(I_R+I_L)$ where $I_R$ represents the intensity of the right-circularly polarized component of light and $I_L$ represents the intensity of the left-circularly polarized component.

In this Specification, when circularly polarized light is described with "sense", it is right-circularly polarized light or left-circularly polarized light. For the sense of circularly polarized light, when we look light moving toward us and the tip of the electric-field vector rotates clockwise with time, the light is defined as right-circularly polarized light; when the tip of the electric-field vector rotates counterclockwise with time, the light is defined as left-circularly polarized light.

In this Specification, for the twisted direction of the helix of cholesteric liquid crystal, the term "sense" may also be used. When the twisted direction (sense) of the helix of cholesteric liquid crystal is right, it reflects right-circularly polarized light and transmits left-circularly polarized light; when the sense is left, it reflects left-circularly polarized light and transmits right-circularly polarized light.

In this Specification, "light" means, unless otherwise specified, light that is visible light and natural light (unpolarized light). Visible light is, of electromagnetic waves, light at wavelengths that is visible by the human eye, and is ordinarily light in a wavelength region of 380 to 780 nm.

In this Specification, a mention of just "reflected light" or "transmitted light" is used in meanings including scattered light and diffracted light.

Note that the polarization state of light at wavelengths can be measured using a spectral radiance meter or spectrometer equipped with circularly polarizing plates. In this case, the intensity of light measured through a right-circularly polarizing plate corresponds to $I_R$, and the intensity of light measured through a left-circularly polarizing plate corresponds to $I_L$. Alternatively, the measurement can also be achieved using an illuminometer or spectrophotometer equipped with a circularly polarizing plate. A right-circularly polarized light transmission plate is attached and the amount of right-circularly polarized light is measured; a left-circularly polarized light transmission plate is attached and the amount of left-circularly polarized light is measured; thus, the ratio can be measured.

In this Specification, the p-polarized light means polarized light that vibrates in a direction parallel to the plane of incidence of light. The plane of incidence means a plane that is perpendicular to the reflection plane (such as the surface of a windshield glass) and includes the incidence ray and the reflected ray. In the p-polarized light, the vibration plane of the electric-field vector is parallel to the plane of incidence.

In this Specification, the in-plane retardation (in-plane retardation Re) is a value measured using AxoScan manufactured by Axometrics (Axometrics) Inc. The measurement wavelength is set at 550 nm unless otherwise specified.

In this Specification, "projection image (projection image)" means an image that is not the surrounding scene such as the forward scene, but is based on projection of light from the projector used. The projection image (projected image) is observed, by the observer, as a virtual image floating beyond the projection-image display area of the windshield glass.

In this Specification, "screen image (screen image)" is an image displayed on the drawing device of the projector or an image drawn, by the drawing device, on the intermediate-image screen, for example. In contrast to the virtual image, the screen image is a real image.

The screen image and the projection image may be monochrome images, multicolor images of two or more colors, or full-color images.

In this Specification, "visible-light transmittance" is the illuminant-A-light-source visible-light transmittance defined in JIS R3212:2015 (Test methods of safety glazing materials for road vehicles). Specifically, the transmittance is determined in the following manner: an illuminant-A light source and a spectrophotometer are used to measure transmittances at wavelengths in the range of 380 to 780 nm; the transmittances at wavelengths are multiplied by the pre-calculated weighting functions obtained from the wavelength distribution and the wavelength interval of CIE (International Commission on Illumination) photopic spectral luminous efficiency and the weighted average is calculated.

In this Specification, the liquid crystal composition and the liquid crystal compound conceptually also include such a composition and a compound that, as a result of curing or the like, no longer exhibit liquid crystallinity.

Hereinafter, a projection-image-displaying laminate film, a projection-image-displaying laminated glass, and an image display system according to the present invention will be described with reference to attached drawings. Note that, in FIG. 1 to FIG. 4 below, like members are denoted by like reference signs.

FIG. 1 is a schematic view of a projection-image-displaying laminate film according to a first embodiment of the present invention.

As illustrated in FIG. 1, a projection-image-displaying laminate film according to the present invention has, upwardly in the drawing, a heat-sealing layer 4, a transparent support 1, a retardation layer 2, and a selective reflection layer 3. In this example, the transparent support 1, the retardation layer 2, and the selective reflection layer 3 constitute a half-mirror film 10. As described later in EXAMPLES, in a projection-image-displaying laminate film according to the present invention, a surface of the heat-sealing layer 4 on a side opposite from the transparent support 1 (half-mirror film 10) has a static coefficient of friction of 1.0 or less, to thereby achieve high lubricity over a glass.

Note that, in a projection-image-displaying laminate film according to the present invention, the stacking order of the layers is not limited to the example illustrated in FIG. 1. For example, a configuration in which, upwardly in the drawing, the heat-sealing layer 4, the retardation layer 2, the selective reflection layer 3, and the transparent support 1 are stacked in this order may be employed.

Figure 2:
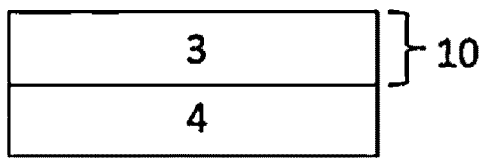
FIG. 2 is a schematic view illustrating another example of a projection-image-displaying laminate film according to the present invention.

FIG. 2 is a schematic view of a projection-image-displaying laminate film according to a second embodiment of the present invention. In the projection-image-displaying film illustrated in FIG. 2, the half-mirror film 10 is formed only of the selective reflection layer 3. In a projection-image-displaying laminate film according to the present invention, when the selective reflection layer 3 is a linearly-polarized-light reflection layer formed of a laminate described later, the half-mirror film 10 does not necessarily have the transparent support 1 or the retardation layer 2.

Thus, in the example illustrated in FIG. 2, the selective reflection layer 3 and the heat-sealing layer 4 disposed on one of the surfaces of the selective reflection layer 3 constitute the projection-image-displaying laminate film.

Figure 3:
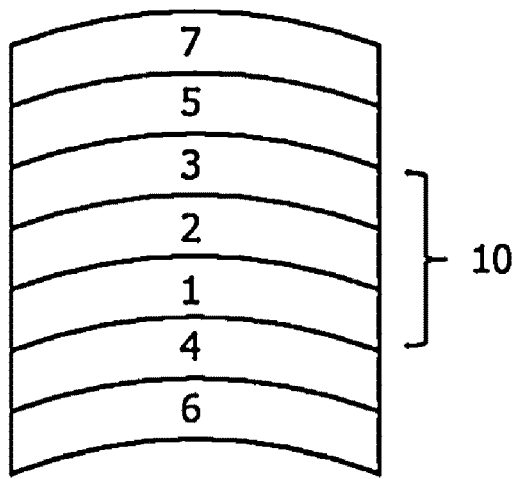
FIG. 3 is a schematic view illustrating an example of a projection-image-displaying laminated glass according to the present invention.

FIG. 3 is a schematic view of an example of a projection-image-displaying laminated glass according to the present invention. Note that, in the following descriptions, "projection-image-displaying laminated glass" may also be simply referred to as "laminated glass".

In a laminated glass according to the present invention, the above-described projection-image-displaying laminate film according to the present invention and an intermediate film 5 disposed adjacent to the selective reflection layer of the projection-image-displaying laminate film are sandwiched between two glass plates.

The laminated glass illustrated in FIG. 3 has, upwardly in the drawing, a first glass plate 6, a heat-sealing layer 4, a transparent support 1, a retardation layer 2, a selective reflection layer 3, an intermediate film 5, and a second glass plate 7. As described later in EXAMPLES, for a projection-image-displaying laminate film according to the present invention, the half-mirror film is provided to have a stiffness at 25° C. of 4.0 N·mm or less to thereby provide high conformability to a glass; furthermore, as described above, a surface of the heat-sealing layer on a side opposite from the transparent support has a static coefficient of friction of 1.0 or less, to provide high lubricity of the heat-sealing layer over a glass, to thereby provide a laminated glass in which formation of wrinkles in the projection-image-displaying laminate film is suppressed.

In FIG. 3, in the laminated glass according to the present invention, the half-mirror film 10 has the transparent support 1 and the retardation layer 2; however, a laminated glass according to the present invention is not limited to this.

Specifically, a laminated glass according to the present invention may use, as a projection-image-displaying laminate film according to the present invention, the configuration in FIG. 2 in which the half-mirror film 10 does not have the transparent support 1 or the retardation layer 2. Thus, a laminated glass according to the present invention does not necessarily have the transparent support 1 or the retardation layer 2.

Hereinafter, a projection-image-displaying laminate film and a laminated glass (projection-image-displaying laminated glass) having such a layer configuration according to the present invention, and layers of a projection-image-displaying laminate film and a laminated glass according to the present invention will be described further in detail.

Projection-Image-Displaying Laminate Film

In this Specification, the projection-image-displaying laminate film means a half-mirror film configured to provide reflected light to display projection images.

A projection-image-displaying laminate film according to the present invention transmits visible light. Specifically, a projection-image-displaying laminate film according to the present invention preferably has a visible-light transmittance of 85% or more, more preferably 86% or more, still more preferably 87% or more.

When it has such a high visible-light transmittance, even in the case of combination with a glass having a low visible-light transmittance, the resultant laminated glass has a visible-light transmittance that satisfies the standard of the windshield glass for vehicles.

A projection-image-displaying laminate film according to the present invention preferably does not exhibit substantial reflection in a wavelength region having high spectral luminous efficacy. Specifically, for incoming light in the normal direction, compared with the ordinary laminated glass, a laminated glass including a projection-image-displaying laminate film according to the present invention preferably exhibits substantially equivalent reflection at and near a wavelength of 550 nm. In particular, in a visible-light wavelength region of 490 to 620 nm, it more preferably exhibits substantially equivalent reflection.

The phrase "substantially equivalent reflection" means that, in the case of measuring, in the normal direction, using a spectrophotometer such as a spectrophotometer "V-670" manufactured by JASCO Corporation, natural light (unpolarized light) of the target wavelengths, the difference in reflectance is 10% or less. In the above-described wavelength region, "substantially equivalent reflection" has a difference in reflectance of preferably 5% or less, more preferably 3% or less, still more preferably 2% or less, particularly preferably 1% or less.

When it exhibits, in the wavelength region having high spectral luminous efficacy, substantially equivalent reflection, even in the case of combination with a glass having a low visible-light transmittance, the resultant laminated glass has a visible-light transmittance that satisfies the standard of the windshield glass for vehicles.

A projection-image-displaying laminate film according to the present invention has the shape of a thin film or a sheet, for example.

Prior to use of a projection-image-displaying laminate film according to the present invention for a windshield glass (laminated glass) or the like, it may have the roll shape of the thin film, for example.

A projection-image-displaying laminate film according to the present invention has a function of a half mirror for at least a portion of projected light, and does not necessarily function as a half mirror for the entire visible-light region of light, for example. A projection-image-displaying laminate film according to the present invention, which may have the above-described function as a half mirror for light at all incidence angles, has the above-described function for at least a portion of light at all incidence angles.

As described above, a projection-image-displaying laminate film according to the present invention includes a half-mirror film and a heat-sealing layer. In a projection-image-displaying laminate film according to the present invention, the half-mirror film includes a selective reflection layer.

In a laminated glass according to the present invention (projection-image-displaying laminated glass), a projection-image-displaying laminate film according to the present invention and an intermediate film are sandwiched between two glass plates, and the intermediate film is adjacent to the selective reflection layer.

Note that, in FIG. 1, the projection-image-displaying laminate film according to the present invention has, as an example, in addition to the selective reflection layer, the transparent support and the retardation layer. A projection-image-displaying laminate film according to the present invention may include, as needed, layers such as an alignment layer and an adhesive layer.

Selective Reflection Layer

The selective reflection layer is a layer that wavelength-selectively reflects light. The selective reflection layer preferably exhibits selective reflection in a portion of the visible-light wavelength region. The selective reflection layer at least reflects light for displaying projection images.

In the present invention, the selective reflection layer having the selective-reflection center wavelength at the shortest wavelength preferably has a selective-reflection center wavelength of 750 nm or less, more preferably 720 nm or less, still more preferably 700 nm or less.

In a projection-image-displaying laminate film according to the present invention, the half-mirror film may include two or more selective reflection layers.

In the two or more selective reflection layers, the selective-reflection center wavelengths may be the same or different, but are preferably different.

For example, in the case of including two selective reflection layers, these two layers preferably have selective-reflection center wavelengths that are different preferably by 60 nm or more, more preferably by 80 nm or more, still more preferably by 100 nm or more. In the two or more selective reflection layers, the selective-reflection center wavelengths may be all in 650 to 780 nm, or at least one of them is in 650 to 780 nm while one or more of the others are in wavelengths of more than 780 nm, but are all preferably in 650 to 780 nm.

The selective reflection layer is preferably a polarized-light reflection layer. The polarized-light reflection layer is a layer that reflects linearly polarized light, circularly polarized light, or elliptically polarized light.

The polarized-light reflection layer is preferably a circularly-polarized-light reflection layer or a linearly-polarized-light reflection layer. The circularly-polarized-light reflection layer is a layer that, in the selective-reflection wavelength region, reflects circularly polarized light of one of senses and transmits circularly polarized light of the other sense. The linearly-polarized-light reflection layer is a layer that, in the selective-reflection wavelength region, reflects linearly polarized light in one polarization direction and transmits linearly polarized light in a polarization direction orthogonal to the reflection polarization direction.

The polarized-light reflection layer transmits polarized light that it does not reflect, and transmits a portion of light even in a wavelength region in which the selective reflection layer exhibits reflection. Thus, it is less likely to degrade the tint of light transmitted by the projection-image-displaying half mirror and is less likely to lower the visible-light transmittance, which is preferred.

The selective reflection layer that is a circularly-polarized-light reflection layer is preferably a cholesteric liquid crystal layer.

Cholesteric Liquid Crystal Layer

In this Specification, the cholesteric liquid crystal layer means a layer in which a cholesteric liquid crystalline phase is fixed.

The cholesteric liquid crystal layer is a layer in which the alignment of the liquid crystal compound having a cholesteric liquid crystalline phase is maintained. The cholesteric liquid crystal layer is typically the following layer: a polymerizable liquid crystal compound is brought into an alignment state of a cholesteric liquid crystalline phase, and subsequently polymerized and cured by, for example, irradiation with ultraviolet rays or heating, to form a layer that has no fluidity and that also has changed to a state in which the alignment form is not changed by an external field or an external force, for example.

Note that, for the cholesteric liquid crystal layer, as long as the optical properties of the cholesteric liquid crystalline phase are maintained within the layer, the liquid crystal compound within the layer may no longer exhibit liquid crystallinity. For example, the polymerizable liquid crystal compound may have, as a result of the curing reaction, increased molecular weight and no longer have liquid crystallinity.

The cholesteric liquid crystal layer is known to exhibit circularly-polarized-light selective reflection: it selectively reflects, of right-circularly polarized light and left-circularly polarized light, circularly polarized light of one of the senses and it transmits circularly polarized light of the other sense.

As films including a layer in which a cholesteric liquid crystalline phase exhibiting circularly-polarized-light selective reflectivity is fixed, there are a large number of known films formed from compositions including polymerizable liquid crystal compounds; for the cholesteric liquid crystal layer, reference can be made to such existing techniques.

The selective-reflection center wavelength $\lambda$ of the cholesteric liquid crystal layer depends on pitch P (=distance between helical turns) of the helix structure in the cholesteric liquid crystalline phase, and is dictated by average refractive index n of the cholesteric liquid crystal layer and the relationship of $\lambda = n \times P$. As is understood from this formula, for the cholesteric liquid crystal layer, the n value and the P value can be adjusted to thereby adjust the selective-reflection center wavelength.

The selective-reflection center wavelength and half-width of the cholesteric liquid crystal layer can be determined in the following manner.

When a spectrophotometer UV3150 (manufactured by SHIMADZU CORPORATION) is used to measure the transmission spectrum of the cholesteric liquid crystal layer (measured in the normal direction of the cholesteric liquid crystal layer), the peak of decrease in the transmittance is observed in the selective reflection region. Of two wavelengths that are at the minimum transmittance corresponding to this peak and at the middle (average) transmittance between the minimum transmittance and the pre-decrease transmittance, the shorter-wavelength-side wavelength is defined as $\lambda_l$ (nm), the longer-wavelength-side wavelength is defined as $\lambda_h$ (nm), and the selective-reflection center wavelength λ and the half-width Δλ can be expressed with the following formulas.

$$\lambda = (\lambda_1 + \lambda_h)/2$$

$$\Delta\lambda = (\lambda_h - \lambda_1)$$

The selective-reflection center wavelength determined in this manner is substantially equal to the centroidal wavelength of the reflection peak of a circularly polarized light reflection spectrum of the cholesteric liquid crystal layer measured in the normal direction.

As described later, the head-up display system can be provided such that light is obliquely incident on the windshield glass, to thereby achieve decreased reflectance at the surface of a glass plate on the projected-light incident side.

In this case, the light is also obliquely incident on the cholesteric liquid crystal layer. For example, light having an incident angle of 45° to 70° relative to the normal line of the projection-image display area in the air having a refractive index of 1, passes through the cholesteric liquid crystal layer having a refractive index of about 1.61 at an angle of about 26° to about 36°. In this case, the selective reflection wavelengths shift to the shorter-wavelength side. In a cholesteric liquid crystal layer having a selective-reflection center wavelength λ, upon passing of light at angle $\theta_2$ relative to the normal direction of the cholesteric liquid crystal layer (in the helical axial direction of the cholesteric liquid crystal layer), when the selective-reflection center wavelength is defined as $\lambda_d$, $\lambda_d$ is expressed by the following formula.

$$\lambda_d = \lambda \times \cos\theta_2$$

Thus, when $\theta_2$ is 26° to 36°, a cholesteric liquid crystal layer having the selective-reflection center wavelength in the range of 650 to 780 nm reflects projected light in the range of 520 to 695 nm.

Such a wavelength range is a wavelength region having high spectral luminous efficacy and hence considerably contributes to the luminance of projection images, which results in projection images having high luminance.

The pitch of the cholesteric liquid crystalline phase depends on the type or addition concentration of a chiral dopant used together with the polymerizable liquid crystal compound, and hence adjustment of these can provide the desired pitch. Note that, as the measurement methods of the helical sense and pitch, the methods described in the following can be used: "Ekisho Kagaku Jikken Nyumon (Guide to Chemical Experiments of Liquid Crystals)" edited by The Japanese Liquid Crystal Society, published by Sigma Shuppan in 2007, p. 46, and "Ekisho Binran (Handbook of Liquid Crystals)" edited by Ekisho Binran Editorial Committee, Maruzen Publishing Co., Ltd., p. 196.

As the cholesteric liquid crystal layers, cholesteric liquid crystal layers whose helical sense is right or left are employed. The sense of reflected circularly polarized light of such a cholesteric liquid crystal layer is the same as the helical sense. In the cholesteric liquid crystal layers that are different in selective-reflection center wavelengths, the helical senses may all be the same or may include a different sense, but are preferably the same.

In a projection-image-displaying laminate film according to the present invention, the half-mirror film preferably does not include, as cholesteric liquid crystal layers exhibiting selective reflection in the same or overlapping wavelength region, cholesteric liquid crystal layers having different helical senses. This is intended to avoid a decrease, to, for example, less than 50%, in the transmittance in a specific wavelength region.

For the half-width Δλ (nm) of the selective reflection range in which selective reflection is exhibited, Δλ depends on birefringence Δn of the liquid crystal compound and the above-described pitch P, and is dictated by the relationship of $\Delta\lambda = \Delta n \times P$. Thus, the width of the selective reflection range can be controlled by adjusting Δn. Δn can be adjusted by adjusting, for example, the type or mixing proportion of the polymerizable liquid crystal compound or by controlling the temperature during fixing of alignment.

In order to form cholesteric liquid crystal layers of a single type that have the same selective-reflection center wavelength, a plurality of cholesteric liquid crystal layers that have the same pitch P and the same helical sense may be stacked. Such cholesteric liquid crystal layers that have the same pitch P and the same helical sense can be stacked to thereby provide, at a specific wavelength, high selectivity for circularly polarized light.

In the case of stacking, in the half-mirror film, a plurality of cholesteric liquid crystal layers, cholesteric liquid crystal layers separately formed may be stacked using, for example, an adhesive, or the following step may be repeated: to the surface of a preformed cholesteric liquid crystal layer provided by a method described later, a liquid crystal composition including a polymerizable liquid crystal compound and the like may be directly applied, aligned, and fixed; preferred is the latter.

This is because, in the case of forming directly, on the surface of the preformed cholesteric liquid crystal layer, the subsequent cholesteric liquid crystal layer, the alignment orientation of liquid crystal molecules on the air-interface side of the preformed cholesteric liquid crystal layer matches the alignment orientation of liquid crystal molecules on the bottom side of the overlying cholesteric liquid crystal layer, so that the laminate of the cholesteric liquid crystal layers has good polarized-light properties. In addition, distortion and uneven interference of the cholesteric liquid crystal layers that can be caused due to unevenness in the thickness of the adhesive layer are not caused, which is advantageous.

The thickness of the cholesteric liquid crystal layer is not particularly limited, but is preferably 0.5 to 10 μm, more preferably 1.0 to 8.0 μm, still more preferably 1.5 to 6.0 μm.

In the present invention, the cholesteric liquid crystal layer can be formed to have a thickness in such a range, to thereby maintain high visible-light transmittance.

Method for Forming Cholesteric Liquid Crystal Layer

Hereinafter, the material and method for forming a cholesteric liquid crystal layer will be described.

The material used for forming the above-described cholesteric liquid crystal layer is, for example, a liquid crystal composition including a polymerizable liquid crystal compound and a chiral dopant (optically active compound). The liquid crystal composition optionally further mixed with, for example, a surfactant and a polymerization initiator and dissolved in a solvent or the like is applied to, for example, a support, an alignment layer, or a cholesteric liquid crystal layer that is to serve as the underlayer; after cholesteric-alignment aging, the liquid crystal composition is cured to thereby be fixed to form a cholesteric liquid crystal layer.

Polymerizable Liquid Crystal Compound

The polymerizable liquid crystal compound, which may be a rod-like liquid crystal compound or a disc-like liquid crystal compound, is preferably a rod-like liquid crystal compound.

The rod-like polymerizable liquid crystal compound forming the cholesteric liquid crystal layer may be, for example, a rod-like nematic liquid crystal compound. Preferred examples of the rod-like nematic liquid crystal compound include azomethines, azoxys, cyanobiphenyls, cyanophenyl esters, benzoic esters, cyclohexanecarboxylic phenyl esters, cyanophenylcyclohexanes, cyano-substituted phenylpyrimidines, alkoxy-substituted phenylpyrimidines, phenyldioxanes, tolanes, and alkenylcyclohexylbenzonitriles. Not only low-molecular-weight liquid crystal compounds, but also high-molecular-weight liquid crystal compounds can be employed.

The polymerizable liquid crystal compound can be obtained by introducing a polymerizable group into a liquid crystal compound. Examples of the polymerizable group include unsaturated polymerizable groups, an epoxy group, and an aziridinyl group; preferred are unsaturated polymerizable groups, and particularly preferred are ethylenically unsaturated polymerizable groups. Introduction of such polymerizable groups into molecules of the liquid crystal compound can be achieved by various methods. The number of polymerizable groups per molecule of the polymerizable liquid crystal compound is preferably 1 to 6, more preferably 1 to 3.

Examples of the polymerizable liquid crystal compound include compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A, for example. Two or more polymerizable liquid crystal compounds may be used in combination. Such use of two or more polymerizable liquid crystal compounds in combination achieves a decrease in the alignment temperature.

In the liquid crystal composition, the amount of the polymerizable liquid crystal compound added relative to the solid content (the mass except for the solvent) of the liquid crystal composition is preferably 80 to 99.9 mass %, more preferably 85 to 99.5 mass %, particularly preferably 90 to 99 mass %.

Chiral Dopant: Optically Active Compound

The chiral dopant has the function of causing the helical structure of the cholesteric liquid crystalline phase. Such chiral dopants, which cause, depending on the compounds, different helical senses or helical pitches, can be selected in accordance with the purpose.

The chiral dopants are not particularly limited, and publicly known compounds can be employed. Examples of the chiral dopants include compounds described in Ekisho Device Handbook (Liquid Crystal Device Handbook) (Chapter 3, Item 4-3, Chiral dopants for TN and STN, p. 199, edited by Japan Society for the Promotion of Science, The 142nd committee, 1989) and patent publications such as JP2003-287623A, JP2002-302487A, JP2002-80478A, JP2002-80851A, JP2010-181852A, and JP2014-034581A.

In general, the chiral dopant includes an asymmetric carbon atom; however, axial asymmetric compounds or planar asymmetric compounds not including asymmetric carbon atoms can also be used as such chiral dopants. Examples of the axial asymmetric compounds or planar asymmetric compounds include binaphthyl, helicene, paracyclophane, and derivatives of the foregoing.

The chiral dopant may have a polymerizable group. When the chiral dopant and the liquid crystal compound each have a polymerizable group, a polymerization reaction between the polymerizable chiral dopant and the polymerizable liquid crystal compound forms a polymer having a repeating unit derived from the polymerizable liquid crystal compound and a repeating unit derived from the chiral dopant. In this example, the polymerizable group of the polymerizable chiral dopant and the polymerizable group of the polymerizable liquid crystal compound are preferably groups of the same type. Thus, the polymerizable group of the chiral dopant is also preferably an unsaturated polymerizable group, an epoxy group, or an aziridinyl group, more preferably an unsaturated polymerizable group, still more preferably an ethylenically unsaturated polymerizable group.

The chiral dopants may be liquid crystal compounds.

Preferred examples of the chiral dopant include isosorbide derivatives, isomannide derivatives, and binaphthyl derivatives. As the isosorbide derivatives, commercially available products such as LC-756 manufactured by BASF may be used.

In the liquid crystal composition, the chiral dopant content relative to the amount of polymerizable liquid crystal compound is preferably 0.01 to 200 mol %, more preferably 1 to 30 mol %. Note that, in the liquid crystal composition, the chiral dopant content means the concentration (mass %) of the chiral dopant relative to the total solid content of the composition.

Polymerization Initiator

The liquid crystal composition preferably contains a polymerization initiator. In an example of performing irradiation with ultraviolet rays to cause the polymerization reaction to proceed, the polymerization initiator employed is preferably a photopolymerization initiator that, upon irradiation with ultraviolet rays, initiates the polymerization reaction. Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), poly-nuclear quinone compounds (described in U.S. Pat. Nos. 3,046,127A and 2,951,758A), combinations of a triaryl imidazole dimer and p-amino phenyl ketone (described in U.S. Pat. No. 3,549,367A), acridine and phenazine compounds (described in JP1985-105667A (JP-S60-105667A) and U.S. Pat. No. 4,239,850A), acylphosphine oxide compounds (JP1988-40799B (JP-S63-40799B), JP1993-29234B (JP-H5-29234B), JP1998-95788A (JP-H10-95788A), JP1998-29997A (JP-H10-29997A), JP2001-233842A, JP2000-80068A, JP2006-342166A, JP2013-114249A, JP2014-137466A, JP4223071B, JP2010-262028A, and JP2014-500852A), oxime compounds (described in JP2000-66385A and JP4454067B), and oxadiazole compounds (described in U.S. Pat. No. 4,212,970A). For example, reference can be made to descriptions in JP2012-208494A, Paragraphs [0500] to [0547].

As the polymerization initiator, an acylphosphine oxide compound or an oxime compound is also preferably employed.

Examples of the acylphosphine oxide compound include a commercially available product that is IRGACURE 810 (compound name: bis(2,4,6-trimethylbenzoyl)-phenylphosphine oxide) manufactured by BASF Japan Ltd. Examples of the oxime compound include commercially available products such as IRGACURE OXE01 (manufactured by BASF), IRGACURE OXE02 (manufactured by BASF), TR-PBG-304 (manufactured by Changzhou Tronly New Electronic Materials Co., Ltd.), ADEKA ARKLS NCI-831, ADEKA ARKLS NCI-930 (manufactured by ADEKA CORPORATION), and ADEKA ARKLS NCI-831 (manufactured by ADEKA CORPORATION).

Such polymerization initiators may be used alone or in combination of two or more thereof.

In the liquid crystal composition, the photopolymerization initiator content relative to the polymerizable liquid crystal compound content is preferably 0.1 to 20 mass %, more preferably 0.5 to 5 mass %.

Crosslinking Agent

The liquid crystal composition may optionally contain a crosslinking agent for the purpose of improving the hardness and durability of the cured film. The crosslinking agent preferably causes curing due to ultraviolet rays, heat, or moisture, for example.

The crosslinking agent is not particularly limited, and can be appropriately selected in accordance with the purpose; examples include polyfunctional acrylate compounds such as trimethylolpropane tri(meth)acrylate and pentaerythritol tri(meth)acrylate; epoxy compounds such as glycidyl (meth) acrylate and ethylene glycol diglycidyl ether; aziridine compounds such as 2,2-bishydroxymethylbutanol-tris[3-(1-aziridinyl)propionate] and 4,4-bis (ethyleneiminocarbonylamino)diphenylmethane; isocyanate compounds such as hexamethylene diisocyanate and biuret isocyanates; polyoxazoline compounds having an oxazoline group in a side chain; and alkoxysilane compounds such as vinyltrimethoxysilane and N-(2-aminoethyl)3-aminopropyltrimethoxysilane. In addition, depending on the reactivity of the crosslinking agent, a publicly known catalyst can be used to thereby improve productivity in addition to improvements in the film hardness and durability. These can be used alone or in combination of two or more thereof.

The crosslinking agent content relative to the polymerizable liquid crystal compound content is preferably 3 to 20 mass %, more preferably 5 to 15 mass %. When the crosslinking agent content is set at 3 mass % or more, the effect of increasing the crosslinking density can be exerted. When the crosslinking agent content is set at 20 mass % or less, degradation of the stability of the cholesteric liquid crystal layer can be suppressed.

Alignment Controlling Agent

To the liquid crystal composition, an alignment controlling agent may be added for contributing to stable or rapid formation of a planar-alignment cholesteric liquid crystal layer. Examples of the alignment controlling agent include fluoro(meth)acrylate polymers described in Paragraphs [0018] to [0043] and the like in JP2007-272185A, compounds represented by Formulas (I) to (IV) in Paragraphs [0031] to [0034] and the like in JP2012-203237A, and compounds described in JP2013-113913A.

Note that such alignment controlling agents may be used alone or in combination of two or more thereof.

In the liquid crystal composition, the amount of alignment controlling agent added relative to the total mass of the polymerizable liquid crystal compound is preferably 0.01 to 10 mass %, more preferably 0.01 to 5 mass %, particularly preferably 0.02 to 1 mass %.

Other Additives

Furthermore, the liquid crystal composition may contain at least one selected from the group consisting of various additives such as surfactants for modifying the surface tension of the coating film to achieve a uniform thickness, and polymerizable monomers. In addition, to the liquid crystal composition, as needed, for example, a polymerization inhibitor, an antioxidant, an ultraviolet absorbent, a light stabilizer, a coloring material, or metal oxide fine particles can be further added as long as the optical performance is not degraded.

The cholesteric liquid crystal layer can be formed in the following manner: a liquid crystal composition including a polymerizable liquid crystal compound, a polymerization initiator, and, as needed, a chiral dopant, a surfactant, or the like that are dissolved in a solvent is applied onto a support, an alignment layer, a preformed cholesteric liquid crystal layer, or the like, and dried to form a coating film; this coating film is irradiated with actinic rays to polymerize the cholesteric liquid crystal composition, to form a cholesteric liquid crystal layer in which the cholesteric regularity is fixed.

Note that a laminate film constituted by a plurality of cholesteric liquid crystal layers can be formed by repeating the above-described steps of producing a cholesteric liquid crystal layer.

Solvent

The solvent used for preparation of the liquid crystal composition is not particularly limited, and can be appropriately selected in accordance with the purpose; organic solvents are preferably used.

The organic solvents are not particularly limited, and can be appropriately selected in accordance with the purpose; examples include ketones, alkyl halides, amides, sulfoxides, heterocyclic compounds, hydrocarbons, esters, and ethers. These can be used alone or in combination of two or more thereof. Of these, in the case of considering the environmental load, ketones are particularly preferred.

Coating, Alignment, and Polymerization

The method of coating with the liquid crystal composition is not particularly limited, and can be appropriately selected in accordance with the purpose; examples include a wire bar coating method, a curtain coating method, an extrusion coating method, a direct gravure coating method, a reverse gravure coating method, a die-coating method, a spin coating method, a dip coating method, a spray coating method, and slide coating method. Alternatively, it can be achieved by transferring a liquid crystal composition disposed by coating on another support. The applied liquid crystal composition is heated to thereby align liquid crystal molecules. The heating temperature is preferably 200° C. or less, more preferably 130° C. or less. This alignment treatment provides an optical thin film in which the polymerizable liquid crystal compound is helically aligned so as to have a helical axis in a direction substantially perpendicular to the film surface.

The aligned liquid crystal compound can be further polymerized to thereby cure the liquid crystal composition. The polarization may be thermal polymerization or photopolymerization using irradiation with light, but is preferably photopolymerization. The irradiation with light is preferably performed using ultraviolet rays. The irradiation energy is preferably 20 mJ/cm$^2$ to 50 J/cm$^2$, more preferably 100 to 1,500 mJ/cm$^2$.

In order to accelerate photopolymerization, irradiation with light may be performed under heating conditions and/or a nitrogen atmosphere. The ultraviolet rays for irradiation preferably have wavelengths of 350 to 430 nm. The polymerization ratio is preferably high from the viewpoint of stability, preferably 70% or more, more preferably 80% or more. The polymerization ratio can be determined by measuring the consumption ratio of the polymerizable functional groups on the basis of an IR absorption spectrum.

Linearly-Polarized-Light Reflection Layer

In a projection-image-displaying laminate film according to the present invention, as the selective reflection layer of the half-mirror film, a linearly-polarized-light reflection layer may be employed.

The linearly-polarized-light reflection layer may be, for example, a polarizer in which thin films different in refractive index anisotropy are laminated. Such a polarizer can be provided to have features of having, as in the cholesteric liquid crystal layer, high visible-light transmittance, and the selective-reflection center wavelength in a specific wavelength region. In addition, it is used in the head-up display system to thereby reflect obliquely incident projected light in wavelengths having high spectral luminous efficacy.

Examples of the polarizer in which thin films different in refractive index anisotropy are laminated include polarizers described in JP1997-506837A (JP-H9-506837A) and the like. In the case of processing under conditions selected for the purpose of achieving the desired refractive index relationship, widely varied materials can be used to form such polarizers.

In general, one of the first materials needs to have, in a selected direction, a refractive index different from that of the second material. This difference in refractive index is achieved by various methods including, during formation of the films or after the formation of the films, stretching, extrusion, or coating. Furthermore, two materials preferably have similar rheological properties (such as melt viscosity) such that they can be simultaneously extruded.

The polarizer in which thin films different in refractive index anisotropy are laminated may be a commercially available product. The commercially available product may be a laminate of a reflective-type polarizing plate and a temporary support. Examples of the commercially available product include DBEF (manufactured by 3M) and APF (Advanced Polarizing Film (Advanced Polarizing Film (manufactured by 3M)).

The reflective-type polarizing plate has a thickness of preferably 0.5 to 50 μm, more preferably 1.0 to 30 μm.

Retardation Layer

In a projection-image-displaying laminate film according to the present invention, the half-mirror film may include, in addition to the selective reflection layer, a retardation layer. In particular, in the case of using, as the selective reflection layer, a cholesteric liquid crystal layer, the half-mirror film preferably includes a retardation layer.

Such combined use of the retardation layer and the cholesteric liquid crystal layer enables displaying of clear projection images. The in-plane retardation and the slow-axis direction can be adjusted, to thereby provide a projection-image-displaying laminate film that, in the head-up display system, provides high luminance and suppresses double images.

In the projection-image-displaying half mirror, the retardation layer is disposed so as to be positioned, during use, on the viewer side relative to all the selective reflection layers (cholesteric liquid crystal layers).

Note that, even in the case where the half-mirror film of the projection-image-displaying laminate film includes, as the selective reflection layer, a cholesteric liquid crystal layer, when the projector of the head-up display system (image display system) emits, for example, circularly-polarized-light projection images, the half-mirror film does not necessarily include the retardation layer.

The retardation layer is not particularly limited, and can be appropriately selected in accordance with the purpose. Examples of the retardation layer include a stretched polycarbonate film, a stretched norbornene polymer film, a transparent film in which birefringent inorganic particles of, for example, strontium carbonate are contained and aligned, a thin film formed by oblique vapor deposition of an inorganic dielectric onto a support, a film in which a liquid crystal compound is uniaxially aligned and the alignment is fixed, and a film in which a polymerizable liquid crystal compound is uniaxially aligned and the alignment is fixed.

The retardation layer is preferably a film in which a polymerizable liquid crystal compound is uniaxially aligned and the alignment is fixed. For example, the retardation layer can be formed in the following manner: the surface of a temporary support or an alignment layer is coated with a liquid crystal composition including a polymerizable liquid crystal compound; subsequently, the polymerizable liquid crystal compound in the liquid crystal composition is formed to be in nematic alignment in the liquid crystal state, and subsequently fixed by curing. In this case, the retardation layer can be formed as in the above-described formation of the cholesteric liquid crystal layer except that the chiral dopant is not added to the liquid crystal composition. Note that, during the nematic alignment of the applied liquid crystal composition, the heating temperature is preferably 50 to 120° C., more preferably 60 to 100° C.

Alternatively, the retardation layer may be obtained in the following manner a composition including a polymeric liquid crystal compound is applied to the surface of a temporary support, an alignment layer, or the like, formed to be in nematic alignment in the liquid crystal state, and subsequently cooled to fix the alignment.

The retardation layer has a thickness of, preferably 0.2 to 300 μm, more preferably 0.4 to 150 μm, still more preferably 0.5 to 80 μm. The thickness of the retardation layer formed from the liquid crystal composition is not particularly limited, but is preferably 0.2 to 10 μm, more preferably 0.4 to 5.0 μm, still more preferably 0.5 to 2.0 μm.

The direction of the slow axis of the retardation layer is preferably determined in accordance with, during use in an image display system such as a head-up display system, the incident direction of the incident light for displaying projection images and the helical sense of the cholesteric liquid crystal layer.

After a laminated glass according to the present invention using a projection-image-displaying laminate film according to the present invention is determined in terms of its orientation during use in the head-up display, the direction of the slow axis of the retardation layer can be determined. For example, when the incident light comes from below (vertically below) the laminated glass (projection-image-displaying laminate film) and is incident on the retardation-layer-side of the cholesteric liquid crystal layer, the direction of the slow axis can be determined in accordance with in-plane retardation so as to be in the following range.

For example, in the case of using a retardation layer in which the in-plane retardation at a wavelength of 550 nm is 250 to 450 nm, the slow axis of the retardation layer relative to the vertically upward direction of the laminated glass (projection-image-displaying laminate film) is preferably set in a range of +30° to +85° or −30° to −85°. Alternatively, in the case of using a retardation layer in which the in-plane retardation at a wavelength of 550 nm is 50 to 180 nm, the slow axis of the retardation layer relative to the vertically upward direction of the laminated glass is preferably set in a range of +120° to +175° or −120° to −175°.

In the windshield glass (combiner) disposed in a vehicle such as an automobile, during ordinary use, in-plane directions in the windshield glass (combiner) that are, relative to the driver, upward and downward (vertically upward and downward directions) directions, and the viewer-side (observer-side, driver-side, or interior-side) surface can be specified.

In this Specification, the vertically upward direction for a windshield glass, a laminated glass, and a projection-image-displaying laminate film means, in the viewer-side surface (specified in the above-described manner) of the windshield glass, the laminated glass, and the projection-image-displaying laminate film, the direction parallel to the vertical direction (specified in the above-described manner) during use.

In the case of using a retardation layer in which the in-plane retardation at a wavelength of 550 nm is 250 to 450 nm, the slow axis of the retardation layer relative to the vertically upward direction of the laminated glass is more preferably in a range of +35° to +70° or −35° to −70°.

Alternatively, in the case of using a retardation layer in which the in-plane retardation at a wavelength of 550 nm is 50 to 180 nm, the slow axis of the retardation layer relative to the vertically upward direction of the laminated glass is more preferably in a range of +125° to +160° or −125° to −160°.

Note that the above-described slow axis is defined using + and −, and these mean, relative to a fixed viewer position, the clockwise direction (+) and the counterclockwise direction (−). The preferred direction depends on the helical sense of the cholesteric liquid crystal layer of the half-mirror film of the projection-image-displaying laminate film. Specifically, the slow axis of the retardation layer is set such that, in accordance with circularly polarized light reflected by the cholesteric liquid crystal layer, the incident linearly polarized light (p-polarized light) is turned into circularly polarized light rotating in a direction to be reflected by the cholesteric liquid crystal layer.

For example, when all the cholesteric liquid crystal layers of the half-mirror film have the right-handed helical sense, the direction of the slow axis of the retardation layer, when viewed from the retardation-layer side to the cholesteric liquid crystal layers, relative to the vertically upward direction, is in 30° to 85° or 120° to 175° in the clockwise direction. When all the cholesteric liquid crystal layers included in the laminated glass have the left-handed helical sense, the slow-axis direction of the retardation layer, when viewed from the retardation-layer side to the cholesteric liquid crystal layers, is in 30° to 85° or 120° to 175° in the counterclockwise direction.

Second Retardation Layer

In a projection-image-displaying laminate film according to the present invention, the half-mirror film may include, in addition to the above-described retardation layer, a second retardation layer.

In the case of disposing the second retardation layer, the above-described retardation layer (hereafter, also referred to as "first retardation layer"), all the cholesteric liquid crystal layers, and the second retardation layer can be disposed in this order. In particular, from the viewer side, the first retardation layer, the selective reflection layers, and the second retardation layer can be disposed in this order.

In addition to the first retardation layer, the second retardation layer is included at the above-described position, to thereby further suppress double images. In particular, in the case of making p-polarized light incident to form projection images, double images can be further suppressed. The reason why use of the second retardation layer results in further suppression of double images is inferentially because double images generated in the following manner are suppressed: light at wavelengths out of the selective reflection region of the cholesteric liquid crystal layers is transformed by the cholesteric liquid crystal layers into polarized light and reflected by the back surface of the windshield glass.

The in-plane retardation of the second retardation layer at a wavelength of 550 nm can be appropriately adjusted in a range of 160 to 460 nm, preferably in a range of 240 to 420 nm.

The material, thickness, and the like of the second retardation layer can be selected as in the first retardation layer.

The slow-axis direction of the second retardation layer is preferably determined in accordance with the incident direction of the incident light for displaying projection images and the helical sense of the cholesteric liquid crystal layers.

For example, in the case of a second retardation layer in which the in-plane retardation at a wavelength of 550 nm is in the range of 160 to 400 nm, the slow axis relative to the vertically upward direction of the laminated glass (projection-image-displaying laminate film) is preferably set in the range of +10° to +35° or −10° to −35°. In the case of a second retardation layer in which the in-plane retardation at a wavelength of 550 nm is in the range of 200 to 400 nm, the slow axis relative to the vertically upward direction of the laminated glass is preferably set in the range of +100° to +140° or −100° to −140°.

Other Layers

The half-mirror film of a projection-image-displaying laminate film according to the present invention may include, in addition to the selective reflection layer serving as the essential element and the above-described first and second retardation layers serving as optional elements, other layers. The other layers are each preferably transparent in the visible-light region.

In addition, the other layers each preferably have low birefringence. In this Specification, low birefringence means that, in the wavelength region in which the projection-image-displaying half mirror of a windshield glass used in the present invention exhibits reflection, the in-plane retardation is 10 nm or less, and the in-plane retardation is preferably 5 nm or less. In addition, the other layers each preferably have a refractive index having a small difference from the average refractive index (in-plane average refractive index) of the cholesteric liquid crystal layers. Examples of the other layers include a support (transparent support), an alignment layer, and an adhesive layer.

Transparent Support

The half-mirror film may include a transparent support. The retardation layer may also serve as the transparent support. Alternatively, the transparent support may also serve as the retardation layer.

In the transparent support preferably used in the present invention, the absolute value of the in-plane retardation at a wavelength of 550 nm is 10 nm or less, and preferably the absolute value of the in-plane retardation is 5 nm or less. In addition, the absolute value of the thickness-direction retardation Rth is preferably 40 nm or less, more preferably 30 nm or less. In the case of such small retardations, the transparent support causes less distortion of polarized light.

The transparent support may shrink due to heat. In particular, when the half-mirror film is sandwiched between two curved glasses to provide a laminated glass, the transparent support heat-shrinks to cause shrinkage of the half-mirror film, to thereby suppress wrinkles, which is preferred.

This is inferentially because, in the flat half-mirror film sandwiched between the curved glasses, wrinkles due to an excess of the film are removed by shrinkage of the half-mirror film including the transparent support.

In general, such a transparent support is provided by production including a stretching process, and has a stress due to the stretching as residual stress. Thus, this residual stress can be used to achieve heat-shrinkage under heating applied by an autoclave during production of the laminated glass. This heat-shrinkage inferentially results in removal of wrinkles formed by sandwiching between the curved glasses. The wrinkles tend to appear in large-glass-curvature portions at and near the outer peripheries of the curved glasses, but tend not to appear in small-glass-curvature portions. For this, the half-mirror film using the heat-shrinkable transparent support exerts the effect of effectively suppressing formation of wrinkles in the large-glass-curvature portions. This is achieved inferentially by the following mechanism: in the large-glass-curvature portions, the film has a degree of freedom of expansion in the thickness direction and the film shrinks in the planar direction; in the small-glass-curvature portions, the film has a low degree of freedom of expansion in the thickness direction and the film scarcely shrinks in the planar direction.

The temperature at which the transparent support heat-shrinks varies depending on the material forming the transparent support; the shrinkage preferably occurs in the range of 80 to 200° C.; the shrinkage more preferably occurs in the range of 100 to 160° C., which is the autoclave treatment temperature during production of ordinary laminated glasses.

The heating for shrinking the transparent support may be performed for the whole laminated glass, but may be locally performed for portions in which the curvature is high and wrinkles tend to appear.

The amount of shrinkage of the transparent support for achieving suppression of the wrinkles of the half-mirror film varies depending on, for example, the curvature and size of the glass. In the transparent support, under autoclave heating conditions for production of the laminated glass, heat-shrinkage ratios in a direction where the heat-shrinkage ratio becomes the maximum and in its orthogonal direction are each preferably 0.01 to 5.0%, more preferably 0.05 to 3.0%, still more preferably 0.2 to 2.0%. When the heat-shrinkage ratios are 0.01% or more, wrinkles tend not to appear during production of the laminated glass. When the heat-shrinkage ratios are 5.0% or less, foaming tends not to occur during production of the laminated glass. The heat-shrinkage ratios can be appropriately adjusted by changing the stretching conditions during production of the transparent support.

The transparent support is preferably formed of a resin such as cellulose acylate or acrylic. In particular, the transparent support is preferably formed of a cellulose acylate resin, and particularly preferably formed of a triacetyl cellulose resin or a diacetyl cellulose resin.

In the present invention, while the transparent support is preferably heated such that the storage modulus of the half-mirror film (laminate) becomes 2.0 GPa or less, two glass plates, the half-mirror film, and an intermediate film described later are bonded together. The storage modulus is made to be 2.0 GPa or less, to thereby achieve improved conformability to the curved glasses, which is preferred.

The thickness of the transparent support is about 5.0 to about 200 µm, preferably 10 to 100 µm, more preferably 15 to 80 µm, still more preferably 20 to 40 µm.

Note that, in the case of using a temporary support to form a half-mirror film having a cholesteric liquid crystal layer and the like, the temporary support may be finally removed. Specifically, the support may be present only during the formation of the half-mirror film, and does not necessarily serve as a constituent layer of the half-mirror film at the time of completion of the half-mirror film.

In this case, the support is not necessarily transparent.

Alignment Layer

The half-mirror film may include an alignment layer as an underlayer coated with the liquid crystal composition during formation of the cholesteric liquid crystal layer or the retardation layer.

The alignment layer can be formed by the following means, for example: rubbing treatment of an organic compound such as a polymer (a resin such as polyimide, polyvinyl alcohol, polyester, polyarylate, polyamide-imide, polyether imide, polyamide, or modified polyamide), oblique vapor deposition of an inorganic compound, formation of a layer having microgrooves, or deposition of, using a Langmuir-Blodgett method (LB film), an organic compound (such as co-tricosanoic acid, dioctadecylmethylammonium chloride, or methyl stearate). Furthermore, an alignment layer that exerts an orientation function upon application of an electric field, application of a magnetic field, or irradiation with light may be used.

In particular, for the alignment layer formed of a polymer, after the rubbing treatment, the surface having been subjected to the rubbing treatment is preferably coated with a liquid crystal composition. The rubbing treatment can be performed by rubbing the surface of the polymer layer with paper or cloth in a specific direction.

Alternatively, without formation of the alignment layer, the surface of the transparent support having been subjected to a rubbing treatment may be coated with a liquid crystal composition. In other words, the transparent support may be used to function as an alignment layer.

The thickness of the alignment layer is not limited, and is preferably 0.01 to 5.0 µm, more preferably 0.05 to 2.0 µm.

Note that, when a temporary support is used for forming a half-mirror film having a cholesteric liquid crystal layer and the like, the alignment layer may be removed together with the temporary support. Specifically, the alignment film may be present only during the formation of the half-mirror film, and does not necessarily serve as a constituent layer of the half-mirror film at the time of completion of the half-mirror film.

Adhesive Layer

The half-mirror film may have, as needed, an adhesive layer for improving adhesiveness of layers.

Examples of the position where the adhesive layer is disposed include, in the case of constituting the selective reflection layer by a plurality of cholesteric layers, between the cholesteric liquid crystal layers; between the selective reflection layer and the retardation layer; and between the selective reflection layer and the transparent support. The adhesive layer may be disposed on the surface of the selective reflection layer. This improves the adhesiveness to the adjacent intermediate film.

The adhesive layer is at least formed from an adhesive.

Such adhesives are of, from the viewpoint of curing method, a hot-melt type, a thermosetting type, a photo-curing type, a reaction curing type, or a pressure-sensitive adhesive type without the necessity of curing. These adhesives can be formed of materials that are compounds of, for example, acrylate-based, urethane-based, urethane acrylate-based, epoxy-based, epoxy acrylate-based, polyolefin-based, modified olefin-based, polypropylene-based, ethylenevinyl alcohol-based, vinyl chloride-based, chloroprene rubber-based, cyano acrylate-based, polyamide-based, polyimide-based, polystyrene-based, or polyvinylbutyral-based. From the viewpoint of usability and productivity, the curing method is preferably a photo-curing type. Alternatively, from the viewpoint of optical transparency and heat resistance, the materials are preferably of acrylate-based, urethane acrylate-based, or epoxy acrylate-based, for example.

Alternatively, the adhesive layer may be formed using a high-transparency adhesive transfer tape (OCA tape). Such high-transparency adhesive transfer tapes may be commercially available products for image display devices, in particular, commercially available products for the surfaces of image display units of image display devices. Examples of the commercially available products include adhesive sheets manufactured by PANAC CO., LTD. (such as PD-S1) and MHM series adhesive sheets manufactured by Nichieikako Co., Ltd.

The thickness of the adhesive layer is not limited. The thickness of the adhesive layer is preferably 0.5 to 10 μm, more preferably 1.0 to 5.0 μm. The adhesive layer that is formed from an OCA tape may have a thickness of 10 μm to 50 μm, preferably 15 μm to 30 μm. It is preferably formed to have a uniform thickness in order to reduce color unevenness and the like of the projection-image-displaying half mirror.

Stiffness of Half-Mirror Film

In a projection-image-displaying laminate film according to the present invention, the half-mirror film preferably has, from the viewpoint of having high conformability to glasses having curved surfaces and suppressing wrinkles and bending, low stiffness [N·mm] expressed by the following formula.

$$\text{Stiffness} = \sigma \times (d/1000)^3$$

where σ represents modulus of elasticity [MPa] and d represents film thickness [μm].

Specifically, in a projection-image-displaying laminate film according to the present invention, the half-mirror film has a stiffness at 25° C. of 4.0 N·mm or less. Thus, the modulus of elasticity of the half-mirror film in this formula is the modulus of elasticity of the half-mirror film at 25° C. In the following descriptions, unless otherwise specified, "stiffness" means stiffness at 25° C.

When the half-mirror film has a stiffness of more than 4.0 N·mm, in the resultant laminated glass described later, it cannot conform to the curved glasses to cause disadvantages such as wrinkles, bending, or sharp bending.

Note that the lower limit of the stiffness of the half-mirror film is not limited; however, excessively low stiffness tends to result in sharp bending and the half-mirror film itself may become difficult to handle. In consideration of this point, the half-mirror film preferably has a strength of 0.01 N·mm or more.

The half-mirror film preferably has a stiffness of 0.015 to 2.0 N·mm, more preferably 0.02 to 1.0 N·mm.

Note that the stiffness of the half-mirror film will be described later in detail.

Heat-Sealing Layer

A projection-image-displaying laminate film according to the present invention has, in addition to the half-mirror film, a heat-sealing layer. In FIG. 1, in the projection-image-displaying laminate film, the heat-sealing layer 4 is disposed on a surface of the transparent support 1 on an opposite side from the selective reflection layer 3 (retardation layer 2).

In a projection-image-displaying laminate film according to the present invention, "heat-sealing layer" is, during production of the laminated glass using a projection-image-displaying laminate film according to the present invention, a layer for physically bonding together the half-mirror film (in the illustrated example, the transparent support 1) of the projection-image-displaying laminate film and a glass plate. In the present invention, the thermoplastic resin included in the heat-sealing layer has the action of causing fusion under heating during production of the laminated glass.

As described later, a projection-image-displaying laminate film according to the present invention has a heat-sealing layer that has a specific thickness and a specific static coefficient of friction, to ensure lubricity of the half-mirror film over a glass plate of the laminated glass and to firmly bond together the half-mirror film and the glass plate while suppressing formation of wrinkles during production of the laminated glass.

In particular, in a projection-image-displaying laminate film according to the present invention, between the transparent support and the heat-sealing layer, a mixture layer is formed in which the component of the transparent support and the component of the heat-sealing layer are mixed, to strengthen the adhesiveness between the transparent support and the heat-sealing layer; thus, in the resultant laminated glass, separation failure within the laminated glass is suppressed.

Note that the heat-sealing layer and the selective reflection layer may be in direct contact with each other, or may be in indirect contact with each other with an adhesive layer or the like therebetween.

In a projection-image-displaying laminate film according to the present invention, the heat-sealing layer has a thickness of 40 μm or less. When the heat-sealing layer is formed to have a thickness of 40 μm or less, the heat-sealing thickness is small and the half-mirror film is disposed close to the glass, so that the smoothness of the glass suppresses distortion of the half-mirror film, to improve the visibility of projection images. The lower limit of the thickness of the heat-sealing layer is not limited, but is preferably 0.1 μm or more. When the heat-sealing layer is formed to have a thickness of 0.1 μm or more, sufficient adhesiveness between the half-mirror film and the glass is achieved, which is preferred.

The heat-sealing layer has a thickness of 40 μm or less, preferably 0.1 to 10.0 μm, more preferably 0.1 to 5.0 μm, still more preferably 0.1 to 2.5 μm, particularly preferably 0.1 to 1.0 μm.

Thermoplastic Resin Included in Heat-Sealing Layer

The heat-sealing layer contains a thermoplastic resin. The heat-sealing layer is preferably transparent. The thermoplastic resin is preferably an amorphous resin.

The thermoplastic resin preferably has high affinity for and high adhesiveness to the glass plate, and can be a resin selected from the group consisting of polyvinyl acetal resins represented by polyvinyl butyral (PVB) resins, ethylene-vinyl acetate copolymers, and chlorine-containing resins. The main component of the heat-sealing layer is preferably such a resin. Note that "main component" means a component that accounts for 50 mass % or more of the total mass of the heat-sealing layer.

Among the above-described resins, preferred examples include polyvinyl acetal resins represented by polyvinyl butyral resins and ethylene-vinyl acetate copolymers; more preferred are polyvinyl acetal resins (also referred to as alkylacetalized polyvinyl alcohols) represented by polyvinyl butyral resins. The resins are preferably synthetic resins.

Polyvinyl butyral can be obtained by subjecting polyvinyl alcohol to acetalization using butyraldehyde. In the above-described polyvinyl acetal resins represented by polyvinyl butyral resins, for the degree of acetalization, the lower limit is preferably 40% and the upper limit is preferably 85%; the lower limit is more preferably 60% and the upper limit is more preferably 80%.

Polyvinyl alcohol serving as a raw material for such resins is ordinarily obtained by saponifying polyvinyl acetate; polyvinyl alcohols having a degree of saponification of 80 to 99.8 mol % are commonly used.

For the degree of polymerization of polyvinyl alcohol, the lower limit is preferably 200 and the upper limit is preferably 10000. When polyvinyl alcohol has a degree of polymerization of 200 or more, the penetration resistance of the resultant laminated glass is less likely to degrade; when it is 10000 or less, high resin-film formability is provided, and the resin film does not have excessively high stiffness and has high workability. The lower limit is more preferably 500 and the upper limit is more preferably 5000. The degree of polymerization used herein means the average degree of polymerization.

Preferred examples of the polyvinyl acetal resins used for the heat-sealing layer include KS-10, KS-1, KS-3, KS-5, and BL-5 manufactured by SEKISUI CHEMICAL CO., LTD. Such a polyvinyl acetal resin applied onto a transparent support tends to form a mixture layer with the transparent support.

In order to form the heat-sealing layer as a thin layer by coating, it is important that the coating liquid has low viscosity. From this viewpoint, the polyvinyl acetal resins preferably have a calculated molecular weight of 10000 or more and 50000 or less; preferred are KS-10 and KS-1. In the present invention, the calculated molecular weight is defined as a value obtained by multiplying the average degree of polymerization of polyvinyl alcohol serving as a raw material by the molecular weight of the acetalized unit.

The heat-sealing layer may include, in addition to the polyvinyl acetal resin, a crosslinking agent for crosslinking polyvinyl alcohol units in the polyvinyl acetal resin structure, which is also one of preferred examples.

The crosslinking agent may be an epoxy-based additive, is particularly preferably a compound having two or more epoxy groups in a single molecule, preferably a compound represented by the following General formula (EP1).

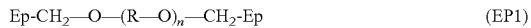

$$\text{Ep-CH}_2\text{-O-(R-O)}_n\text{-CH}_2\text{-Ep} \quad \text{(EP1)}$$

In General formula (EP1) above, Ep is an epoxy group, R is an alkylene group having 2 to 4 carbon atoms, and n is 1 to 30. Note that, when n is 2 or more, the plurality of R's may be the same or different.

Specific examples of the compound represented by General formula (EP1) above include products manufactured by Nagase ChemteX Corporation such as Denacol EX-810, 811, 821, 830, 832, 841, 850, 851, 861, 911, 920, 931, and 941.

In the case of using, as the crosslinking agent, an epoxy-based additive, a cationic polymerization initiator (photo-acid generator) can be used that is an onium salt constituted by a light-absorbing cation moiety and an anion moiety serving as an acid generation source; publicly known sulfonium salt-based or iodonium salt-based cationic polymerization initiators can be used. In particular, preferred are iodonium-based cationic polymerization initiators.

Solvent of Coating Composition of Heat-Sealing Layer

The heat-sealing layer is preferably formed from a coating composition.

In the present invention, the coating composition for forming the heat-sealing layer can contain at least one solvent.

Specific examples of the solvent include, in the case where the transparent support is formed of triacetyl cellulose, ketones such as acetone, methyl ethyl ketone, cyclohexanone, methyl isobutyl ketone, and diacetone alcohol; esters such as methyl formate, methyl acetate, ethyl acetate, butyl acetate, and ethyl lactate; nitrogen-containing compounds such as nitromethane, acetonitrile, N-methylpyrrolidone, and N,N-dimethylformamide; glycols such as methyl glycol and methyl glycol acetate; ethers such as tetrahydrofuran, 1,4-dioxane, dioxolane, and diisopropyl ether; halogenated hydrocarbons such as methylene chloride, chloroform, and tetrachloroethane; glycol ethers such as methyl cellosolve, ethyl cellosolve, butyl cellosolve, and cellosolve acetate; others such as dimethyl sulfoxide and propylene carbonate; and mixtures of the foregoing. Preferred examples include esters and ketones such as methyl acetate, ethyl acetate, butyl acetate, and methyl ethyl ketone. In addition, alcohols such as methanol, ethanol, isopropyl alcohol, butanol, and isobutyl alcohol and aromatic hydrocarbons such as toluene and xylene can be mixed with the above-described solvents and used.

The solvent of the coating composition for the heat-sealing layer is preferably a solvent in which the thermoplastic resin included in the heat-sealing layer is dissolved; in the case of polyvinyl butyral, examples include alcohols such as methanol, ethanol, isopropyl alcohol, butanol, isobutyl alcohol, and diacetone alcohol; aromatic hydrocarbons such as toluene and xylene; glycol ethers such as methyl cellosolve, ethyl cellosolve, butyl cellosolve, and cellosolve acetate; ketones such as acetone, methyl ethyl ketone, cyclohexanone, methyl isobutyl ketone, diisobutyl ketone, and isophorone; amides such as N,N-dimethylacetamide, N,N-dimethylformamide, and N-methyl-2-pyrrolidone; esters such as methyl formate, methyl acetate, ethyl acetate, butyl acetate, and ethyl lactate; ethers such as tetrahydrofuran, 1,4-dioxane, dioxolane, diisopropyl ether, and ethyl ether; halogenated hydrocarbons such as methylene chloride, chloroform, and tetrachloroethane; nitrogen-containing compounds such as nitromethane, acetonitrile, N-methylpyrrolidone, and N,N-dimethylformamide; glycols such as methyl glycol and methyl glycol acetate; others such as dimethyl sulfoxide, propylene carbonate, and water; and mixtures of the foregoing.

Static Coefficient of Friction of Heat-Sealing Layer

In a projection-image-displaying laminate film according to the present invention, in order to improve lubricity of the heat-sealing layer over a glass plate of the laminated glass, the heat-sealing layer preferably has a low static coefficient of friction. Specifically, in a projection-image-displaying laminate film according to the present invention, the heat-sealing layer has a static coefficient of friction of 1.0 or less. Note that, in a projection-image-displaying laminate film according to the present invention, the static coefficient of friction of the heat-sealing layer is the static coefficient of friction of a surface of the heat-sealing layer on a side opposite from the half mirror.

When the heat-sealing layer has a static coefficient of friction of more than 1.0, it has insufficient lubricity over the glass plate of the laminated glass, to cause the following disadvantages: for example, it sharply bends to form wrinkles during production of the laminated glass; removal of the wrinkles causes sharp bending of the projection-image-displaying laminate film, which leaves marks.

The heat-sealing layer preferably has a static coefficient of friction as low as possible, preferably 0.8 or less, more preferably 0.6 or less.

Note that, in the present invention, the static coefficient of friction of the heat-sealing layer is a static coefficient of friction with float glass.

Examples of preferred means for lowering the static coefficient of friction of the heat-sealing layer include a method of using, for example, embossing and particles to form surface irregularities, and a method of localizing, in the surface, a compound for lowering the coefficient of friction with glass. In particular, the method using fine particles is inferentially preferred because fine irregularities are formed to achieve lowering of the static friction, which does not affect the optical performance and the like and does not increase the number of steps.

For the fine particles, an appropriate amount of fine particles including at least one species selected from the group consisting of inorganic fine particles of, for example, silica (silicon dioxide), aluminum oxide, titanium dioxide, zirconium oxide, calcium carbonate, talc, clay, calcined kaolin, calcined calcium silicate, hydrated calcium silicate, aluminum silicate, magnesium silicate, and calcium phosphate, and polymer fine particles can be added to the heat-sealing layer. In this case, the added fine particles are inferentially distributed in the surface of the heat-sealing layer, to roughen the surface, to lower the static coefficient of friction.

The fine particles added to the heat-sealing layer are preferably dispersed particles having an average primary particle size of 5 to 380 nm, more preferably dispersed particles having an average primary particle size of 30 to 200 nm.

As the fine particles added to the heat-sealing layer, fine particles forming secondary particles that are aggregates of primary particles can also be preferably used. In this case, the primary particles preferably have an average primary particle size of 5 to 50 nm. The secondary particles preferably have an average secondary particle size of 50 to 380 nm, more preferably 100 to 250 nm.

When the particles have a size in such a range, they roughen the heat-sealing surface and, in the resultant laminated glass, settle within the heat-sealing layer and do not cause optical defects such as haze.

The inorganic fine particles added to the heat-sealing layer are preferably silica fine particles; for example, a commercially available composition containing silica fine particles (commercially available colloidal silica dispersion liquid) itself or in combination with a desirable organic solvent can be used.

The preferred amount of fine particles (solid content) in the coating composition for the heat-sealing layer relative to the total solid content of the coating composition for the heat-sealing layer is preferably 1 to 40 mass %, more preferably 3 to 30 mass %. Thus, the fine particle content in the heat-sealing layer is preferably 1 to 40 mass %, more preferably 3 to 30 mass %.

During formation of the heat-sealing layer, the residual solvent amount is preferably small from the viewpoint of adhesiveness and lubricity. Preferred examples of the method of reducing the residual solvent amount include a method of increasing the temperature during drying and a method of increasing the drying time.

The drying temperature is preferably equal to or more than the boiling point of the solvent employed and 200° C. or less, more preferably 80 to 150° C. The drying time is preferably 0.2 to 300 minutes, more preferably 0.5 to 10 minutes. After the heat-sealing layer is formed, it is preferably left under an environment at the atmospheric pressure for one day or longer.

The above-described average primary particle sizes of the fine particles are values measured for fine particles included in the dispersion liquid composition or fine particles included in the heat-sealing layer.

The measurement is performed by observation using a transmission electron microscope. Specifically, for 50 primary particles randomly selected, the diameters of the circumcircles of the primary particles are determined and arithmetically averaged to obtain the average primary particle size. The observation magnification of the transmission electron microscope is, in the magnification range of 500,000 to 5,000,000, a desirable magnification at which the primary particle sizes can be determined.

The above-described average secondary particle sizes of the inorganic fine particles are values measured by performing sphere fitting (refractive index: 1.46) using a laser-diffraction scattering particle-size-distribution measurement device. The measurement device is, for example, MicroTrac MT3000 manufactured by MicrotracBEL Corp.

Another means for lowering the static coefficient of friction of the surface of the heat-sealing layer may be use of an appropriate amount of water as the solvent of the coating composition for forming the heat-sealing layer. When water is used, steam inferentially acts during drying and solidification of the heat-sealing layer to roughen its surface. The water content in the coating composition for the heat-sealing layer relative to the total of the solvent is preferably 2 to 8 mass %.

Adhesiveness Improving Agent

A compound that has a plurality of groups selected from the group consisting of polymerizable groups and groups that can form bonds to the resin contained in the transparent support (hereafter, also referred to as an adhesiveness improving agent) has a function of improving the adhesiveness between the heat-sealing layer and the half-mirror film.

At least one of the heat-sealing layer or a layer (adjacent to the heat-sealing layer) of the half-mirror film contains the component derived from the above-described adhesiveness improving agent, which is one of preferred embodiments of a projection-image-displaying laminate film according to the present invention. Thus, in FIG. 1, in the projection-image-displaying laminate film, the heat-sealing layer 4 and/or the transparent support 1 preferably contains the component derived from the adhesiveness improving agent. On the other hand, in FIG. 2, in the projection-image-displaying laminate film, the heat-sealing layer 4 and/or the selective reflection layer 3 preferably contains the component derived from the adhesiveness improving agent.

Note that the above-described component derived from the adhesiveness improving agent means a component obtained as a result of a reaction of, in the adhesiveness improving agent, the groups selected from the group consisting of polymerizable groups and groups that can form bonds to the resin contained in the transparent support. For example, the adhesiveness improving agent can be included in a heat-sealing-layer-forming coating solution, so that the resultant heat-sealing layer includes the component derived from the adhesiveness improving agent.

In the adhesiveness improving agent, the polymerizable groups are defined as above. The number of the polymerizable groups is not particularly limited, and may be one or plural (two or more); when the adhesiveness improving agent does not have groups that can form bonds to the resin contained in the transparent support, it has a plurality of polymerizable groups.

Specifically, the adhesiveness improving agent can be selected from the group consisting of commercially available monomers and oligomers having a plurality of polymerizable groups, particularly preferably having three or more polymerizable groups. Examples of the monomers and oligomers include U6HA (hexafunctional urethane acrylate oligomer) manufactured by Shin Nakamura Chemical Co., Ltd. and PET-30 manufactured by Nippon Kayaku Co., Ltd.

When the adhesiveness improving agent has a polymerizable group, the above-described polymerization initiator is preferably appropriately selected and used. Note that, in the following descriptions, an example case where a layer (adjacent to the heat-sealing layer) of the half-mirror film is the transparent support will be described; however, the same applies to cases where another layer of the half-mirror film is adjacent to the heat-sealing layer.

The group that is included in the adhesiveness improving agent and can form a bond to the resin contained in the transparent support (hereafter, also referred to as a reactive group) means a group that interacts with a group of a material forming the resin contained in the transparent support, to thereby be chemically adsorbed onto the resin contained in the transparent support.

Examples of the reactive group include a boronic acid group, boronic acid ester groups, an oxiranyl group, an oxetanyl group, a hydroxy group, a carboxyl group, an isocyanate group, and —SiX$_3$ (where X's represent a halogen, an alkoxy group, or an alkyl group, and at least one of X's is a halogen or an alkoxy group). In particular, when the above-described resin contained in the transparent support is a partially saponified cellulose ester resin, the reactive group is preferably, among the groups described as examples, a group that can form a bond to a remaining hydroxy group in the cellulose ester resin (such as a boronic acid group, a boronic acid ester group, an isocyanate group, or —SiX$_3$), more preferably a boronic acid group, a boronic acid ester group, or an isocyanate group. The number of reactive groups is not particularly limited, and may be one or plural (two or more).

The adhesiveness improving agent may be a compound having only a plurality of polymerizable groups or a compound having only a plurality of groups that can form bonds to the resin contained in the transparent support. Examples of the compound having only a plurality of polymerizable groups include commercially available polyfunctional monomer compounds. Examples of the compound having only a plurality of groups that can form bonds to the resin contained in the transparent support include polyisocyanates such as CORONATE L manufactured by Tosoh Corporation.

The adhesiveness improving agent is particularly preferably a compound that has at least one polymerizable group in the molecule, and has, in the molecule, at least one group that can form a bond to the resin contained in the transparent support, from the viewpoint of providing high adhesiveness between the transparent support and the heat-sealing layer.

When, between the transparent support and the heat-sealing layer, their mixture layer is formed, the adhesiveness improving agent considerably exerts the effect of improving the adhesiveness; in other words, formation of the mixture layer and use of the adhesiveness improving agent exert synergistic effect, which is preferred.

The adhesiveness improving agent is, for example, most preferably, from the viewpoint of providing higher adhesiveness between the transparent support and the heat-sealing layer, a compound represented by Formula (A).

$(Z)_n$—X-Q    Formula (A)

In Formula (A), Z represents a substituent having a polymerizable group. The polymerizable group is defined as above. Specific preferred examples of the substituent having a polymerizable group include substituents including a (meth)acryloyl group, a styryl group, a vinyl ketone group, a vinyl group, a butadiene group, a vinyl ether group, an oxiranyl group, an aziridinyl group, or an oxetanyl group, more preferably substituents including a (meth)acryloyl group, a styryl group, a vinyl group, an oxiranyl group, or an oxetanyl group, still more preferably substituents including a (meth)acryloyl group or a styryl group, particularly preferably substituents including a (meth)acryloyl group.

In particular, Z is preferably a group represented by Formula (II) below, or a substituent having an oxiranyl group or an oxetanyl group.

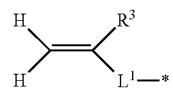

Formula (II)

In Formula (II), R$^3$ is a hydrogen atom or a methyl group, preferably a hydrogen atom.

L$^1$ is a single bond or a divalent linking group selected from the group consisting of —O—, —CO—, —NH—, —CO—NH—, —COO—, —O—COO—, an alkylene group, an arylene group, a heterocyclic group (heteroaryl group), and combinations of the foregoing, preferably a single bond, —CO—NH—, or —COO—, most preferably a single bond or —CO—NH—. * represents the point of attachment.

In Formula (A), Q is a group that can form a bond to the resin contained in the transparent support. This group is defined as above.

In Formula (A), X represents a n+1-valent linking group.

n represents an integer of 1 to 4, more preferably represents 1.

Note that, in the case where n is 1, X represents a divalent linking group, is preferably, for example, a divalent linking group selected from the group consisting of —O—, —CO—, —NH—, —CO—NH—, —COO—, —O—COO—, an alkylene group, an arylene group, a heteroaryl group, and combinations of the foregoing, more preferably a substituted or unsubstituted arylene group.

X is preferably —COO-arylene group-, -arylene group-, or —CONH-arylene group-, more preferably —COO-arylene group-.

Surface Modification Treatment

In the half-mirror film, for the purpose of improving the adhesiveness to the intermediate film and/or the heat-sealing layer, at least one of the surfaces may be subjected to modification treatment.

The surface treatment process may be, for example, corona treatment, glow discharge treatment, plasma treatment, ozone-UV irradiation treatment, saponification treatment, or primer treatment, and can be appropriately selected in accordance with the type of the material forming the surface of the half-mirror film.

Operation/Working-Effect of Projection-Image-Displaying Laminate Film According to the Present Invention As described above, a projection-image-displaying laminate film according to the present invention has a half-mirror film including a selective reflection layer, and a heat-sealing layer disposed on one of the surfaces of the half-mirror film. In a projection-image-displaying laminate film according to the present invention, the half-mirror film has a stiffness of 4.0 N·mm or less, the heat-sealing layer has a thickness of 40 µm or less, and a surface of the heat-sealing layer opposite from the half-mirror film has a static coefficient of friction of 1.0 or less.

A projection-image-displaying laminate film according to the present invention has such features, to thereby enable, in the case of being placed within a laminated glass and used in a projection-image display device such as a head-up display system, projection of undistorted screen images having high visibility.

The half-mirror film can be placed within a laminated glass for automobiles, and this can be used as a windshield glass, to thereby form a head-up display using the windshield glass.

The laminated glass used as a windshield glass has a configuration in which an intermediate film described later is disposed between two glass plates. Thus, in the case of using the half-mirror film as the projection-image-displaying member of the head-up display system, two intermediate films sandwiching the half-mirror film therebetween are placed between two glass plates to form the laminated glass.

However, when the half-mirror film is placed within the laminated glass and used as the projection-image-displaying member, projection images have distortion and projection images have poor visibility, which is problematic.

The inventors of the present invention performed thorough studies on this point. As a result, they have found that the distortion of the projection images is caused by distortion of the half-mirror film.

In general, the laminated glass is produced in the following manner: an intermediate film is sandwiched between two glass plates and subjected to heating-pressurization treatment using an autoclave. During the heating-pressurization treatment, such intermediate films soften and, as a result, the smoothness of the half mirror sandwiched between the intermediate films considerably degrades, which results in distortion of the half mirror.

By contrast, in a projection-image-displaying laminate film according to the present invention, one of the intermediate films sandwiching the film is provided as a heat-sealing layer having a considerably small thickness of 40 µm or less. As a result, the projection-image-displaying laminate film conforms to the glass surface. As a result, distortion of the film due to the heating-pressurization treatment using an autoclave can be suppressed.

In most cases, the windshield glass is a curved glass. Thus, even when the thickness of the intermediate film is reduced, as long as the half mirror has high stiffness, the half mirror cannot conform to the glass curved surface, and the half mirror forms wrinkles, which results in distortion in the projection images.

In a projection-image-displaying laminate film according to the present invention, the half-mirror film is provided to have a low stiffness of 4.0 N·mm or less; as a result, even when the windshield (laminated glass) is a curved glass, the film suitably conforms to the glass surface, to suppress formation of wrinkles.

The surfaces of the heat-sealing layers included in projection-image-displaying films have poor lubricity over glass. This is inferentially because the thermoplastic resin of such a heat-sealing layer used for providing adhesiveness to glass has poor lubricity over glass. Thus, during production of a laminated glass, lamination of glasses and a half-mirror film causes formation of wrinkles in portions of the half-mirror film.

The following has also been found: in a case where the half-mirror film is provided to have low stiffness, when the wrinkles are forcedly removed, the heat-sealing layer does not slide over the glass, so that the film bends to leave marks (bending marks) where displayed screen images distort.

By contrast, in a projection-image-displaying laminate film according to the present invention, a surface of the heat-sealing layer on a side opposite from the half mirror has a static coefficient of friction of 1.0 or less. As a result, a projection-image-displaying film according to the present invention can be laminated with glasses without formation of wrinkles, to produce a laminated glass.

A projection-image-displaying laminate film according to the present invention, a laminated glass according to the present invention using a projection-image-displaying laminate film according to the present invention, and an image display system according to the present invention using a laminated glass according to the present invention have such features, to thereby enable displaying undistorted projection images having high visibility.

Windshield Glass

A projection-image-displaying laminate film according to the present invention can be used to provide a windshield glass having a function of displaying projection images.

In this Specification, windshield glasses mean windowpanes of various conveyances including vehicles such as automobiles and trains, aircraft, watercraft, and playground equipment. The windshield glasses are preferably forward windowpanes of conveyances. The windshield glasses are preferably windshields of vehicles.

Such a windshield glass preferably has a visible-light transmittance of 70% or more, more preferably more than 70%, still more preferably 75% or more, particularly preferably 80% or more. Such a visible-light transmittance is preferably satisfied in any position of the windshield glass; in particular, the projection-image display area preferably satisfies such a visible-light transmittance.

The windshield glass (a laminated glass according to the present invention) may have a flat shape. Alternatively, the windshield glass (a laminated glass according to the present invention) may be molded for being incorporated into the target conveyance and may have a curved surface, for example.

The windshield glass may have, in the projection-image display area, a uniform thickness or non-uniform thicknesses. For example, as in a vehicle glass described in JP2011-505330A, the glass may have a wedge-shaped cross section and the projection-image display area may have non-uniform thicknesses; however, the projection-image display area preferably has a uniform thickness.

Projection-Image Display Area

A projection-image-displaying laminate film according to the present invention is disposed at least in the projection-image display area of a windshield glass.

The projection-image-displaying laminate film can be disposed on an outer surface of the glass plate of a windshield glass, or can be disposed between the two glass plates of a windshield glass (laminated glass), to thereby form a projection-image display area. In the case of disposing the projection-image-displaying laminate film on an outer surface of the glass plate of a windshield glass, the projection-image-displaying laminate film may be disposed on the viewer side of the glass plate, or may be disposed on a side opposite from the viewer side, but is preferably disposed on the viewer side. The projection-image-displaying laminate film is more preferably disposed between two glass plates. This is because the projection-image-displaying laminate film having lower scratch resistance than the glass plates is protected.

In this Specification, the projection-image display area is an area where reflected light is used to display projection images, and is an area where projection images projected by a projector or the like are at least visibly displayed.

The projection-image display area functions as a combiner of a head-up display system. In the head-up display system, the combiner means an optical member that visibly displays screen images projected from the projector, and, in the case of observation of the combiner from the same surface side as the screen-image-displaying side, enables simultaneous observation of information or scene on the opposite surface side. In other words, the combiner has a function of an optical-path combiner that combines together and displays the external light and the image light.

The projection-image display area (combiner) may be disposed over the whole surface of the windshield glass, or in a portion of the total area of the windshield glass. In such a case where the projection-image display area is disposed in a portion, it may be disposed in any position of the windshield glass, but is preferably disposed such that, during use of the head-up display system, virtual images are displayed at a position easily visible by the observer (such as a driver). For example, in the target conveyance, on the basis of the relationship between the position of the driver's seat and the position of the projector disposed, the position where the projection-image display area is disposed can be determined.

The projection-image display area may have a flat shape without having curved surfaces, but may have a curved surface, and may have, as a whole, a concave or convex shape so as to display projection images that are enlarged or reduced in size.

The ordinary windshield glass is a laminated glass in which two glass plates sandwich an intermediate film therebetween.

In a laminated glass according to the present invention, a laminate of the above-described projection-image-displaying laminate film according to the present invention and an intermediate film adjacent to the selective reflection layer of the projection-image-displaying laminate film are sandwiched between two glass plates.

Glass Plates of Laminated Glass

In this Specification, in the windshield glass, the glass plate on the viewer side (interior side) is also referred to as the first glass plate, and the glass plate at a position farther from the viewer side is also referred to as the second glass plate.

As the glass plates, glass plates ordinarily used for windshield glasses can be used. For example, highly heat-insulating green glasses, which are glass plates having a visible-light transmittance of 80% or less such as 73% or 76%, may be used. Even in such a case of using glass plates having a low visible-light transmittance, use of a projection-image-displaying half mirror according to the present invention enables production of a windshield glass having a visible-light transmittance of 70% or more even in the projection-image display area.

In a laminated glass according to the present invention, two glass plates preferably have curved surfaces; in particular, the projection-image-displaying-laminate-film-side glass plate preferably has a projection-image-displaying-laminate-film-side surface that is a convex curved surface. As illustrated in FIG. 3 illustrating an example of a laminated glass according to an embodiment of the present invention, to the curved surface, the half-mirror film 10 is preferably bonded with the heat-sealing layer 4 therebetween.

A laminated glass according to the present invention is preferably used as a windshield glass.

The thicknesses of the glass plates are not particularly limited, but may be about 0.5 to about 5.0 mm, preferably 1.0 to 3.0 mm, more preferably 2.0 to 2.3 mm.

The first glass plate and the second glass plate in terms of material or thickness may be the same or different.

Intermediate Film

As the intermediate film, any of publicly known intermediate films used for publicly known laminated glasses can be used.

For example, a resin film including a resin selected from the group consisting of polyvinyl butyral (PVB), ethylene-vinyl acetate copolymers, and chlorine-containing resins can be used. Such a resin preferably serves as the main component of the intermediate film. Note that the main component means a component that accounts for 50 mass % or more of the intermediate film.

Of the above-described resins, preferred are polyvinyl butyral and ethylene-vinyl acetate copolymers, and more preferred is polyvinyl butyral. The resins are preferably synthetic resins.

Polyvinyl butyral can be obtained by acetalization of polyvinyl alcohol using butyraldehyde. For the degree of acetalization of polyvinyl butyral, the lower limit is preferably 40% and the upper limit is preferably 85%; the lower limit is more preferably 60% and the upper limit is more preferably 75%.

Polyvinyl alcohol is ordinarily obtained by saponifying polyvinyl acetate. Polyvinyl alcohol having a degree of saponification of 80 to 99.8 mol % is ordinarily used.

For the degree of polymerization of polyvinyl alcohol, the lower limit is preferably 200 and the upper limit is preferably 3000. When polyvinyl alcohol has a degree of polymerization of 200 or more, the penetration resistance of the resultant laminated glass is less likely to degrade; when the degree of polymerization is 3000 or less, the resin film formability is high, and the resin film does not have excessively high stiffness and has high workability. The lower limit is more preferably 500 and the upper limit is more preferably 2000.

In a preferred embodiment according to the present invention, the projection-image-displaying laminate film and the intermediate film are placed such that all the peripheral portions of the projection-image-displaying laminate film are positioned inside by 5 mm or more relative to the peripheral portions of the intermediate film; subsequently, under heating, two glass plates, the projection-image-displaying laminate film, and the intermediate film are bonded together. In such a case where the peripheral portions are positioned inside relative to the peripheral portions of the intermediate film, the peripheral portions are sealed by the intermediate film, which suppresses lateral entry of the air to thereby prevent formation of wrinkles.

Preferably, all the peripheral portions of the projection-image-displaying laminate film are positioned inside by 10 mm or more, particularly preferably positioned inside by 15 mm or more, relative to the peripheral portions of the intermediate film.

Intermediate Film Including Projection-Image-Displaying Laminate Film

A projection-image-displaying laminate film according to the present invention, prior to production into a laminated glass, may be bonded to a surface of the intermediate film in advance.

The projection-image-displaying laminate film and the intermediate film can be bonded together by publicly known bonding methods, preferably by lamination treatment. In the case of performing the lamination treatment, in order that the projection-image-displaying laminate film and the intermediate film do not separate after the processing, it is preferably performed under conditions of heating and compression to some extent.

In order to achieve lamination with stability, the film surface temperature of the bonding side of the intermediate film is preferably set at 50 to 130° C., more preferably 70 to 100° C.

During lamination, compression is preferably performed. The compression is preferably performed under conditions of less than 2.0 kg/cm² (less than 196 kPa), more preferably 0.5 to 1.8 kg/cm² (49 to 176 kPa), still more preferably 0.5 to 1.5 kg/cm² (49 to 147 kPa).

Layer Positioned on Viewer Side of Selective Reflection Layer

In general, in the projection-image-displaying member, an image based on reflected light from a layer reflecting projected light overlaps an image based on reflected light from, when viewed from the light-incident side of the projection-image-displaying member, a front surface or a back side surface, to cause the problem of double images (or multiple images).

In a laminated glass according to the present invention, light transmitted by the selective reflection layer is circularly polarized light having a sense opposite to that of the circularly polarized light reflected by the selective reflection layer, or is polarized light orthogonal to the linearly polarized light reflected by the selective reflection layer; the reflected light from the back side surface is less likely to cause noticeable double images when a layer closer to the back-side-surface side than the selective reflection layer has low birefringence because ordinarily the polarized light reflected by the selective reflection layer accounts for a large portion. In particular, as the projected light, polarized light can be used, so that most of the projected light is reflected by the selective reflection layer.

On the other hand, the reflected light from the front surface can cause noticeable double images. In particular, when the distance from the center of gravity (center in the thickness direction) of the selective reflection layer to, when viewed from the light-incident side of the laminated glass, the front surface is a certain value or more, double images can be noticeable.

Specifically, in the structure of a laminated glass according to the present invention, when the total thickness of the layers on the retardation-layer side relative to the selective reflection layer (not including the thickness of the selective reflection layer), in other words, the distance from the viewer-side surface of the selective reflection layer to the viewer-side surface of the laminated glass (windshield glass) is 0.5 mm or more, double images can be noticeable; when the distance is 1 mm or more, double images can be more noticeable; when the distance is 1.5 mm or more, double images can be still more noticeable; when the distance is 2.0 mm or more, double images can be particularly noticeable. Examples of the layers disposed closer to the viewer side relative to the selective reflection layer include, in addition to the retardation layer, the transparent support, the heat-sealing layer, and the first glass plate.

However, in a laminated glass according to the present invention, during displaying of projection images using p-polarized light described later, even in the case where the total thickness of the layers closer to the viewer side than the selective reflection layer satisfies such a range, projection images are visible without noticeable double images.

Head-Up Display System (Image Display System)

A laminated glass according to the present invention can be used as a constituent member of a head-up display system (image display system). An image display system according to the present invention is an image display system configured to project screen images onto a laminated glass according to the present invention, from a p-polarized-light light source.

For example, a laminated glass according to the present invention can be used, in vehicles and the like, as a windshield providing a head-up display system. The head-up display system preferably includes a projector.

Figure 4:
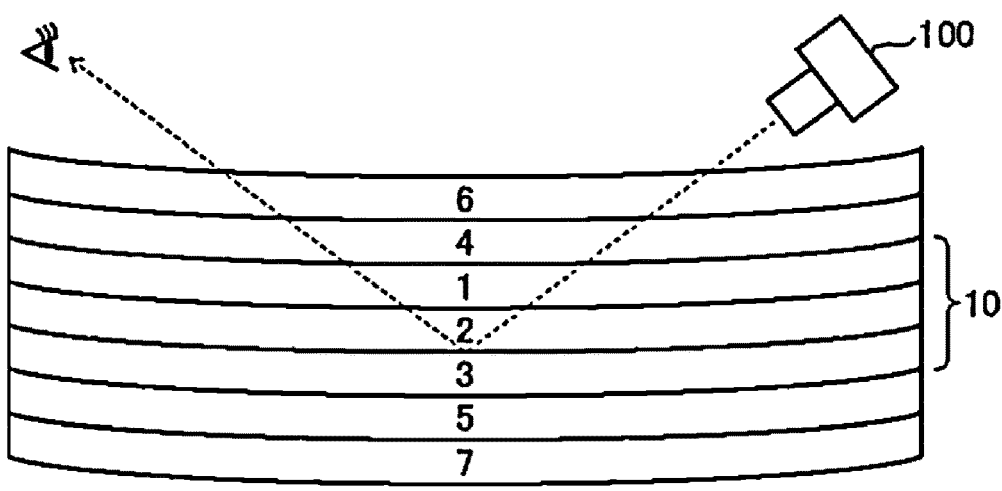
FIG. 4 is a schematic view illustrating an example of an image display system according to the present invention.

FIG. 4 schematically illustrates an example of a head-up display system using a laminated glass according to the present invention as the windshield glass. The example illustrated in FIG. 4 employs, as the laminated glass, the laminated glass according to the present invention illustrated in FIG. 3; a projector 100 projects screen images from the first-glass-plate-6 side onto the windshield glass (laminated glass), and the user views the screen images from the first-glass-plate-6 side.

Projector

In this Specification, "projector" is a "device configured to project light or screen images" and includes a "device configured to project drawn screen images". In a head-up display system used in the present invention, the projector is disposed at least so as to achieve incidence, at the above-described oblique incident angle, on the projection-image-displaying laminate film in the windshield glass. In the head-up display system, the projector preferably includes a drawing device and is configured to display a screen image (real image) drawn on the small intermediate-image screen, as a virtual image using a combiner as a result of reflection.

Drawing Device

The drawing device may be itself a device configured to display screen images, or a device configured to emit light for drawing screen images. In the drawing device, light from the light source is adjusted by a drawing mode such as a light modulator, laser luminance modulating means, or light deflecting means for drawing. In this Specification, the drawing device means a device including a light source and further including, depending on the drawing mode, a light modulator, laser luminance modulating means, or light deflecting means for drawing, for example.

Light Source

The light source is not particularly limited, and examples include LEDs (including Light Emitting Diodes, light emitting diodes, and organic light emitting diodes (OLEDs (Organic Light Emitting Diodes)), discharge tubes, and laser light sources. Of these, preferred are LEDs and discharge tubes. They are suitable as light sources of drawing devices configured to emit linearly polarized light. In particular, LEDs are particularly preferred.

This is because LEDs do not have continuous emission wavelengths in the visible light region, and hence are suitable for combination with, as described later, a combiner using a cholesteric liquid crystal layer that exhibits selective reflection for a specific wavelength region.

Drawing Mode

The drawing mode can be selected in accordance with, for example, the light source employed or the application, and is not particularly limited.

Examples of the drawing mode include the LCD (Liquid Crystal Display) mode and the LCOS (Liquid Crystal on Silicon) mode using a fluorescent display tube and liquid crystal, the DLP (Digital Light Processing) mode, and the scanning mode using a laser. The drawing mode may be a mode using a fluorescent display tube integrated with the light source. The drawing mode is preferably LCD.

In the LCD mode and the LCOS mode, light rays of colors are modulated and combined in the light modulator, and the light is emitted through the projection lens.

The DLP mode is the displaying system using DMD (Digital Micromirror Device) in which micromirrors corresponding to the number of pixels are disposed for drawing and light is emitted through the projection lens.

The scanning mode is a mode of scanning a beam over the screen to form an image using afterimage of the eyes; for example, reference can be made to descriptions of JP1995-270711A (JP-H7-270711A) and JP2013-228674A. In the scanning mode using a laser, luminance-modulated laser beams of colors (such as a red beam, a green beam, and a blue beam) are combined by, for example, a combiner optical system or a condensing lens into a single beam, and the beam is scanned using light deflecting means to draw images on the intermediate-image screen described later.

In the scanning mode, modulation of the luminance of laser beams of colors (such as a red beam, a green beam, and a blue beam) can be achieved directly by changing the intensity of the light source or by using an external modulator.

Examples of the light deflecting means include a galvano-mirror, a combination of a galvano-mirror and a polygon mirror, and MEMS (Micro Electro Mechanical Systems); of these, preferred is MEMS. Examples of the scanning process include the random scanning process and the raster scanning process; preferred is the raster scanning process. In the raster scanning process, the laser beam can be scanned, for example, using resonance frequency in the horizontal direction and using saw-tooth waves in the vertical direction. The scanning mode does not require projection lenses, which facilitates reduction in the device size.

The emitted light from the drawing device may be linearly polarized light or natural light (unpolarized light).

The emitted light from the drawing device included in a head-up display system used in the present invention is preferably linearly polarized light. In the drawing devices having a drawing mode of LCD or LCOS and the drawing devices using laser light sources, the emitted light is inherently linearly polarized light. In such a drawing device in which the emitted light is linearly polarized light and the emitted light includes light rays of a plurality of wavelengths (colors), the polarization directions (transmission-axis directions) of the plurality of polarized light rays are preferably the same or orthogonal to each other. In some commercially available drawing devices, it is known that emitted light does not have, in the wavelength regions of red, green, and blue light, uniform polarization directions (refer to JP2000-221449A). Specifically, there is a known example in which the polarization direction of green light is orthogonal to the polarization direction of red light and the polarization direction of blue light.

Intermediate-Image Screen

As described above, the drawing device may use an intermediate-image screen. In this Specification, "intermediate-image screen" is a screen on which screen images are drawn. Specifically, for example, when light emitted from the drawing device is still invisible as screen images, the drawing device uses this light to form visible screen images on the intermediate-image screen.

The screen images drawn on the intermediate-image screen may be projected by light passing through the intermediate-image screen onto the combiner, or may be reflected by the intermediate-image screen and projected onto the combiner.

Examples of the intermediate-image screen include scattering films, microlens arrays, and screens for rear projection. For example, when the intermediate-image screen is formed from a plastic material and the intermediate-image screen has birefringence, the polarization plane and the intensity of polarized light incident on the intermediate-image screen are distorted, which tends to result in color unevenness or the like in the combiner; however, a retardation layer having a predetermined retardation can be used, to thereby reduce the problematic color unevenness.

The intermediate-image screen preferably has a function of broadening and transmitting the incident ray. This enables displaying of enlarged projection images. Such an intermediate-image screen is, for example, a screen formed of a microlens array. Examples of such micro-array lenses used for head-up displays are described in JP2012-226303A, JP2010-145745A, and JP2007-523369A.

The projector may include, for example, a reflex mirror that adjusts the optical path of the projected light formed in the drawing device.

For the head-up display system in which a windshield glass is used as a projection-image-displaying member, reference can be made to JP1990-141720A (JP-H2-141720A), JP1998-96874A (JP-H10-96874A), JP2003-98470A, U.S. Pat. No. 5,013,134A, and JP2006-512622A, for example.

A laminated glass according to the present invention is particularly useful for a windshield glass combined with a projector using a light source that does not have continuous emission wavelengths in the visible light region such as a laser, LED, or OLED, to provide a head-up display system. This is because, in accordance with the emission wavelengths, the selective-reflection center wavelength of the cholesteric liquid crystal layer can be adjusted. The laminated glass can also be used for projection in displays having polarized display light such as LCDs (liquid crystal display apparatuses).

Projected Light (Incident Light)

Onto a laminated glass according to the present invention, screen images are projected from a p-polarized-light light source, to thereby provide an image display system according to the present invention in which the viewer views the reflected images. For example, when a laminated glass according to the present invention is used as a windshield glass to provide a head-up display system, screen images of p-polarized light are projected onto the windshield glass from a projector, to thereby provide an image display system according to the present invention in which the viewer views the reflected images.

The incident direction of the p-polarized light is the direction in which the projection-image-displaying laminate film included within the laminated glass functions as a reflective polarizer for linearly polarized light (p-polarized light); when the projection-image-displaying laminate film has a selective reflection layer and a retardation layer, the light source is disposed such that the p-polarized light is incident on the retardation-layer side.

Incident light is preferably made incident on, relative to the normal line of the projection-image-displaying half mirror, at an oblique incident angle of 45° to 70°. The interface between a glass having a refractive index of about 1.51 and the air having a refractive index of 1 has a Brewster angle of about 56°; p-polarized light incident at an angle in the range provides a small amount of reflected light from the viewer-side surface of the windshield glass relative to the selective reflection layer for incident light for displaying projection images, so that the screen images can be displayed while being less affected by double images. The angle is also preferably 50° to 65°. In this case, the projection images are observed at least, on the incident side of projected light, relative to the normal line of the selective reflection layer, on the side opposite from the incident light, at angles of 45° to 70°, preferably 50° to 65°.

When a laminated glass according to the present invention is used as a windshield glass, incident light may be incident in any direction such as from above, below, left, or right of the windshield glass, which can be determined in accordance with the viewing direction. For example, preferred is incidence from below during use at the above-described oblique incident angle.

More preferably, the slow axis of the retardation layer in the windshield glass forms an angle of 30° to 85° or 120° to 175° relative to the vibration direction of the incident p-polarized light (plane of incidence of incident light) in accordance with the in-plane retardation of the retardation layer.

As described above, in a head-up display (an image display system according to the present invention), projected light during displaying of projection images is p-polarized light vibrating in a direction parallel to the plane of incidence. When the light emitted from the projector is not linearly polarized light, a linearly polarizing film may be disposed on the emission side of the projector to thereby achieve conversion into p-polarized light, or conversion into p-polarized light may be achieved in the optical path from the projector to the windshield glass. As described above, for a projector in which emitted light does not have a uniform polarization direction in wavelength regions of red, green, and blue light, the polarization direction is preferably wavelength-selectively adjusted such that, in the wavelength regions of all colors, p-polarized light is incident.

The head-up display system may be a projection system in which the virtual-image-forming position is changeable. Such a projection system is described in, for example, JP2009-150947A. When the virtual-image-forming position is changeable, the driver can view the virtual images more comfortably and more conveniently. The virtual-image-forming position is the position where the vehicle's driver views the virtual images and is ordinarily, for example, a position that is beyond the windshield glass from the driver and is 1000 mm or more away.

In this case, as with the above-described glass in JP2011-505330A, when the glass is non-uniform (wedge shape) in the projection-image display area, in response to a change of the virtual-image-forming position, the angle of the wedge shape also needs to be changed. Thus, for example, as described in JP2017-15902A, the angle of the wedge shape needs to be partially changed to change the projection position to thereby virtually achieve the change in the virtual-image-forming position.

In a head-up display system using a laminated glass according to the present invention as the windshield glass and provided to use p-polarized light as described above, the necessity of using the wedge-shape glass has been eliminated and the glass in the projection-image display area can be provided to have a uniform thickness; thus, the head-up display system can suitably employ the above-described projection system in which the virtual-image-forming position is changeable.

EXAMPLES

Hereinafter, the present invention will be more specifically described with reference to Examples. In Examples, Comparative Examples, and Preparation Examples below, materials, reagents, amounts and ratios of materials, procedures, and the like can be appropriately changed without departing from the spirit and scope of the present invention. Thus, the scope of the present invention is not limited to the following Examples and Reference Examples.

Preparation of Coating Solutions
Cholesteric-Liquid-Crystal-Layer-Forming Coating Solutions The following components were mixed, to prepare cholesteric-liquid-crystal-layer-forming coating solutions B, G, and R having the following compositions.

| Composition of Coating solution B | |
|---|---|
| Compound 1 | 80 parts by mass |
| Compound 2 | 20 parts by mass |
| Fluorocompound 1 | 0.02 parts by mass |
| Fluorocompound 3 | 0.01 parts by mass |
| Right-handed chiral dopant LC756 (manufactured by BASF) | adjusted in accordance with target reflection wavelength |
| Polymerization initiator IRGACURE OXE01 (manufactured by BASF) | 0.75 parts by mass |
| Solvent (methyl acetate) | in amount providing solute concentration of 20 mass % |

| Compositions of Coating solutions G and R | |
|---|---|
| Mixture 1 | 100 parts by mass |
| Fluorocompound 1 | 0.05 parts by mass |
| Fluorocompound 2 | 0.04 parts by mass |
| Right-handed chiral dopant LC756 (manufactured by BASF) adjusted in accordance with target reflection wavelength | |
| Polymerization initiator IRGACURE OXE01 (manufactured by BASF) | 1.0 part by mass |
| Solvent (methyl ethyl ketone) in amount providing solute concentration of 25 mass % | |

Mixture 1

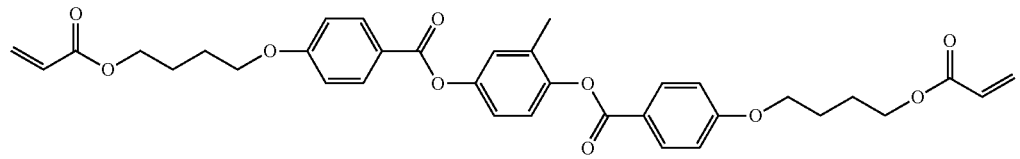

84%

Compositions of Coating solutions G and R
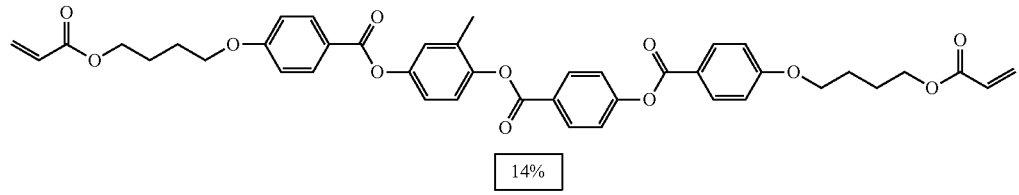 [SMILES: C=CC(=O)OCCCCOc1ccc(C(=O)Oc2ccc(C(=O)Oc3ccc(OC(=O)c4ccc(OCCCCOC(=O)C=C)cc4)cc3C)cc2)cc1]
14%
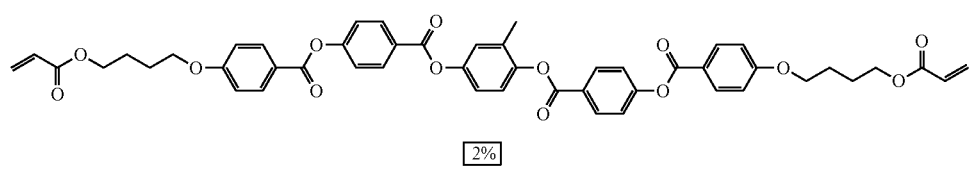 [SMILES: C=CC(=O)OCCCCOc1ccc(C(=O)Oc2ccc(C(=O)Oc3ccc(OC(=O)c4ccc(OC(=O)c5ccc(OCCCCOC(=O)C=C)cc5)cc4)c(C)c3)cc2)cc1]
2%
Compound 1
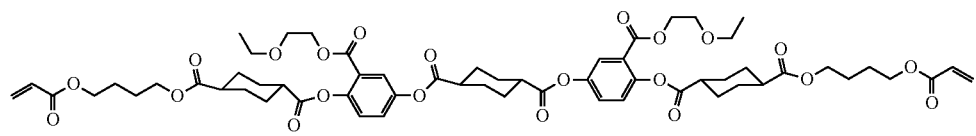 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOCC)c4)CC3)cc2C(=O)OCCOCC)CC1]
Compound 2
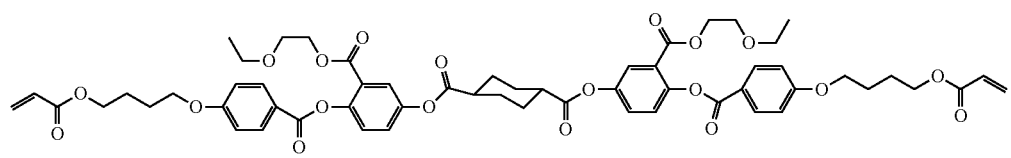 [SMILES: C=CC(=O)OCCCCOc1ccc(C(=O)Oc2ccc(OC(=O)C3CCC(C(=O)Oc4ccc(OC(=O)c5ccc(OCCCCOC(=O)C=C)cc5)c(C(=O)OCCOCC)c4)CC3)cc2C(=O)OCCOCC)cc1]
Fluorocompound 1
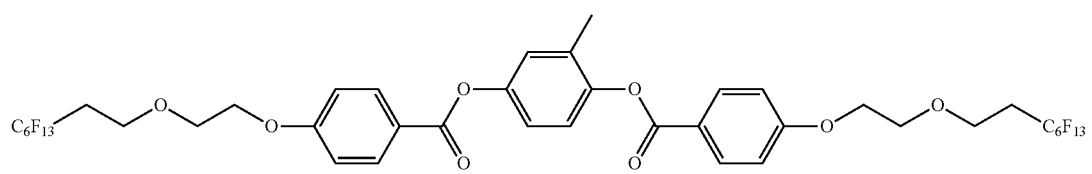
Fluorocompound 2
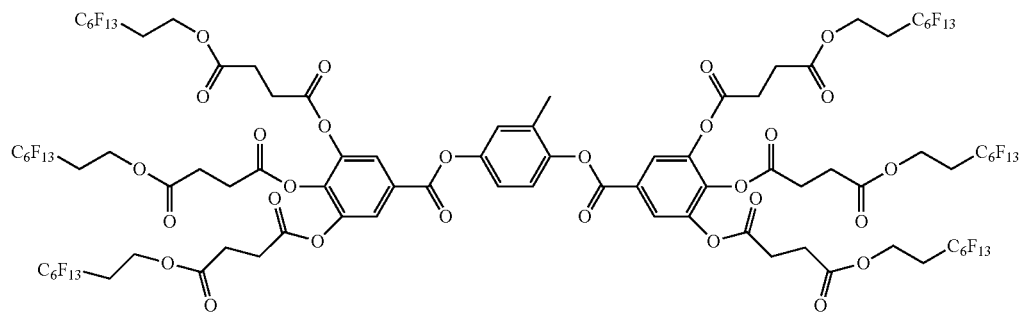

Compositions of Coating solutions G and R

Fluorocompound 3

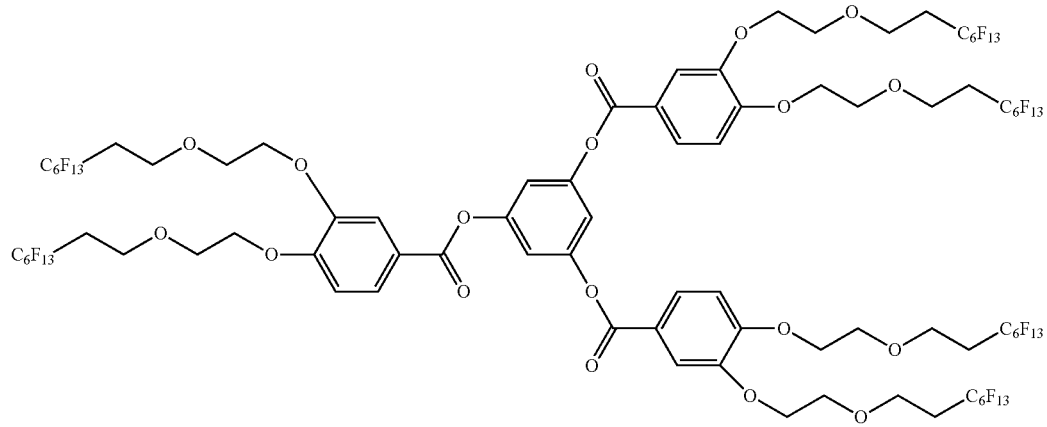

The formulation amount of the chiral dopant LC-756 in the above-described coating solution compositions was adjusted, to prepare Coating solutions B, G, and R. The coating solutions were each used to form a cholesteric liquid crystal monolayer on a peelable support as in formation of a selective reflection layer described later, and the reflection characteristics were examined; as a result, such cholesteric liquid crystal layers formed were all found to be right-circularly-polarized-light reflection layers, and to have selective-reflection center wavelengths described in the following Table 1.

TABLE 1

| Coating solution | Center reflection wavelength |
|---|---|
| Coating solution B | 515 nm |
| Coating solution G | 685 nm |
| Coating solution R | 775 nm |

Retardation-Layer-Forming Coating Solution

The following components were mixed, to prepare a retardation-layer-forming coating solution having the following composition.

| Composition of retardation-layer-forming coating solution | |
|---|---|
| Mixture 1 | 100 parts by mass |
| Fluorocompound 1 | 0.05 parts by mass |
| Fluorocompound 2 | 0.01 parts by mass |
| Polymerization initiator IRGACURE OXE01 (manufactured by BASF) | 0.75 parts by mass |
| Solvent (methyl ethyl ketone) | in amount providing solute concentration of 25 mass % |

Saponification of Cellulose Acylate Films

The same formation method as in Example 20 in WO2014/112575A was performed to form a cellulose acylate film having a thickness of 40 μm.

The formed cellulose acylate film was passed through dielectric heating rolls at a temperature of 60° C. to increase the film surface temperature to 40° C.; subsequently, one of the surfaces of the film was coated with an alkali solution having a composition below using a bar coater in a coating amount of 14 mL/m², and left for 10 seconds under a steam far-infrared heater (manufactured by NORITAKE CO., LIMITED) heated at 110° C.

Subsequently, the bar coater was used again for coating with pure water in 3 mL/m².

Subsequently, the film was subjected to, three times, a process of washing with water using a fountain coater and draining using an air knife, and subsequently dried by being left in a drying zone at 70° C. for 5 seconds, to form saponified Cellulose acylate film 1.

In addition, cellulose acylate films formed so as to have film thicknesses of 80 μm, 25 and 100 μm were prepared and treated as above, to form Cellulose acylate films 2, 3, and 4.

In addition, a cellulose acylate film formed so as to have a film thickness of 40 μm and so as to have a high residual stress under controlled stretching conditions was prepared, and treated as above, to form Cellulose acylate film 5.

The in-plane retardation of Cellulose acylate films 1 to 5 was measured using AxoScan, and found to be 1 nm.

Furthermore, Cellulose acylate films 1 to 5 were heated at 140° C. for 60 minutes. As a result, Cellulose acylate films 1 to 4 were found to have, in a direction of the maximum heat-shrinkage ratio, a shrinkage ratio of 0.5%, and have, in its orthogonal direction, a heat-shrinkage ratio of 0.1%. On the other hand, Cellulose acylate film 5 was found to have, in a direction of the maximum heat-shrinkage ratio, a shrinkage ratio of 0.8%, and have, in its orthogonal direction, a heat-shrinkage ratio of 0.7%.

| Composition of alkali solution | |
|---|---|
| Potassium hydroxide | 4.7 parts by mass |
| Water | 15.7 parts by mass |
| Isopropanol | 64.8 parts by mass |
| Surfactant ($C_{16}H_{33}O(CH_2CH_2O)_{10}H$) | 1.0 part by mass |
| Propylene glycol | 14.9 parts by mass |

Formation of Alignment Film

In saponified Cellulose acylate film 1 (transparent support) obtained above, the saponified surface was coated with an alignment-film-forming coating solution having the following composition using a wire bar coater in 24 mL/m², and dried using hot air at 100° C. for 120 seconds, to obtain an alignment film having a thickness of 0.5 µm.

| Composition of alignment-film-forming coating solution | |
|---|---|
| Modified polyvinyl alcohol described below | 28 parts by mass |
| Citrate (AS3, manufactured by Sankyo Kagaku Yakuhin Co., Ltd.) | 1.2 parts by mass |
| Photo-initiator (IRGACURE 2959, manufactured by BASF) | 0.84 parts by mass |
| Glutaraldehyde | 2.8 parts by mass |
| Water | 699 parts by mass |
| Methanol | 226 parts by mass |

Modified polyvinyl alcohol

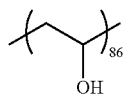

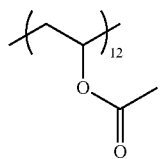

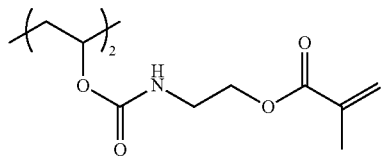

Formation of Half-Mirror Films

The alignment film formed above was subjected to rubbing treatment in a direction at 31.5° rotated counterclockwise relative to the short-side direction (rayon cloth, pressure: 0.1 kgf (0.98 N), number of revolutions: 1000 rpm, transport speed: 10 m/min, number of processes: rubbing back and forth once).

The rubbed surface of Cellulose acylate film 1 was coated with the retardation-layer-forming coating solution using a wire bar, subsequently dried, heat-treated at 55° C. for 1 minute, placed on a hot plate at 50° C., and irradiated with ultraviolet rays for 6 seconds using an electrodeless lamp "D bulb" manufactured by Heraeus (60 mW/cm²) to fix the liquid crystal phase, to obtain a retardation layer having a thickness of 1.9 µm. At this time, the retardation layer was measured in terms of retardation and the angle of slow axis using AxoScan; as a result, the retardation was 349 nm and the angle of slow axis relative to the vertically upward direction (short-side direction) of the finished laminated glass was +58.5°.

The surface of the obtained retardation layer was coated with Coating solution B using a wire bar, subsequently dried and heat-treated at 85° C. for 1 minute, placed on a hot plate at 80° C., and irradiated with ultraviolet rays for 6 seconds using an electrodeless lamp "D bulb" (60 mW/cm²) manufactured by Heraeus to fix the cholesteric liquid crystalline phase, to provide a cholesteric liquid crystal layer having a thickness of 2.3 µm.

Furthermore, the surface of the obtained cholesteric liquid crystal layer was coated with Coating solution G using a wire bar, subsequently dried and heat-treated at 70° C. for 1 minute, placed on a hot plate at 75° C., and irradiated with ultraviolet rays for 6 seconds using an electrodeless lamp "D bulb" (60 mW/cm²) manufactured by Heraeus to fix the cholesteric liquid crystalline phase, to provide a cholesteric liquid crystal layer having a thickness of 0.7 µm.

Furthermore, the surface of the obtained cholesteric liquid crystal layer was coated with Coating solution R using a wire bar, subsequently dried and heat-treated at 70° C. for 1 minute, placed on a hot plate at 75° C., and irradiated with ultraviolet rays for 6 seconds using an electrodeless lamp "D bulb" (60 mW/cm²) manufactured by Heraeus to fix the cholesteric liquid crystalline phase, to provide a cholesteric liquid crystal layer having a thickness of 2.8 µm.

This provided Half-mirror film A1 having a selective reflection layer constituted by the retardation layer and the three layers of cholesteric liquid crystal layers. Half-mirror film A1 was measured in terms of transmission spectrum using a spectrophotometer (manufactured by JASCO Corporation, V-670); as a result, the transmission spectrum had selective-reflection center wavelengths at 515 nm, 685 nm, and 775 nm.

The same procedures were performed except that Cellulose acylate film 1 was replaced by Cellulose acylate films 2 to 5, to form Half-mirror films A2 to 4 and A7. Half-mirror films A2 to 4 and A7 were measured in terms of transmission spectrum using a spectrophotometer (manufactured by JASCO Corporation, V-670); as a result, in each of the half-mirror films, the transmission spectrum had selective-reflection center wavelengths at 515 nm, 685 nm, and 775 nm.

The surface of the cholesteric liquid crystal layer of Half-mirror film A1 was subjected to, using an apparatus manufactured by Vetaphone A/S, corona treatment (5.0 kJ/cm²), to form Half-mirror film A5.

As another half-mirror film, a linearly-polarized-light reflective plate was prepared.

On the basis of the method described in JP1997-506837A (JP-H9-506837A), the number and thickness of layers of 2,6-polyethylene naphthalate (PEN) and layers of a co-polyester (coPEN) of naphthalate 70/terephthalate 30 were adjusted, to form Half-mirror film A6.

Half-mirror film A6 was measured in terms of transmission spectrum using a spectrophotometer (manufactured by JASCO Corporation, V-670); as a result, the transmission spectrum had a selective-reflection center wavelength at 685 nm.

Formation of Heat-Sealing Layers
Heat-Sealing-Layer-Forming Coating Solution

The following components were mixed, to prepare Heat-sealing-layer-forming coating solutions H1 to 14 having compositions in the following Table 2. The compositions are described in units of mass %.

TABLE 2

| | | Heat-sealing coating solution | | | | | | | | | | | | | |
|---|---|---|---|---|---|---|---|---|---|---|---|---|---|---|---|
| | Composition | H1 | H2 | 113 | H4 | 115 | H6 | H7 | H8 | H9 | H10 | H11 | H12 | H13 | H14 |
| Heat-sealing resin | S-LEC KS-10 (manufactured by SEKISUI CHEMICAL CO., LTD.) | 4.0 | 4.0 | 3.5 | 4.9 | 4.8 | 4.5 | | 4.8 | 4.8 | 4.9 | 4.9 | 4.9 | 5.0 | |

TABLE 2-continued

| | Composition | H1 | H2 | H3 | H4 | H5 | H6 | H7 | H8 | H9 | H10 | H11 | H12 | H13 | H14 |
|---|---|---|---|---|---|---|---|---|---|---|---|---|---|---|---|
| | S-LEC BL-5 (manufactured by SEKISUI CHEMICAL CO., LTD.) | | | | | | | 4.8 | | | | | | 5.0 | |
| Fine-particle dispersion liquid | IPA-ST-ZL (manufactured by Nissan Chemical Industries, Ltd.) | 3.3 | | | | | | | | | | | | | |
| | MEK-ST-ZL (manufactured by Nissan Chemical Industries, Ltd.) | | 3.3 | | | | | | | | | | | | |
| | MEK-ST-L (manufactured by Nissan Chemical Industries, Ltd.) | | | 5.0 | | | | | | | | | | | |
| | AEROSIL RX300 (manufactured by NIPPON AEROSIL CO., LTD.) 5% MiBK dispersion liquid | | | | 2.0 | 5.0 | 10.0 | 5.0 | 5.0 | 5.0 | 5.0 | 5.0 | 5.0 | | |
| Solvent | Methyl ethyl ketone | | 64.2 | 63.0 | 65.2 | 63.2 | 59.9 | 63.2 | 54.2 | 72.2 | 36.0 | 45.1 | 54.1 | 66.5 | 66.5 |
| | Methanol | 92.7 | 28.5 | 28.5 | 27.9 | 27.0 | 25.6 | 27.0 | 36.0 | 18.0 | | | | 28.5 | 28.5 |
| | Butyl acetate | | | | | | | | | | 54.1 | 45.0 | 36.0 | | |
| | Concentration of solid contents | 5% | 5% | 5% | 5% | 5% | 5% | 5% | 5% | 5% | 5% | 5% | 5% | 5% | 5% |

Preparation of Silica-Particle Dispersion Liquids

As inorganic fine particles preferably used for a heat-sealing layer in the present invention, AEROSIL RX300 (manufactured by NIPPON AEROSIL CO., LTD., average primary particle size: 7 nm) was added to MiBK (methyl isobutyl ketone) such that the concentration of solid contents became 5 mass %, and stirring using a magnetic stirrer was performed for 30 minutes. Subsequently, an ultrasonic dispersion machine (manufactured by SMT CO., LTD., Ultrasonic Homogenizer UH-600S) was used to perform ultrasonic dispersion for 10 minutes, to prepare a silica-particle dispersion liquid.

From the obtained dispersion liquid, a portion was sampled for measurement of the average secondary particle size; Microtrac MT3000 (manufactured by MicrotracBEL Corp.) was used to measure the average secondary particle size of silica particles in the dispersion liquid, and it was found to be 190 nm.

For IPA-ST-ZL (manufactured by Nissan Chemical Industries, Ltd., average primary particle size: 70 to 100 nm), MEK-ST-ZL (manufactured by Nissan Chemical Industries, Ltd., average primary particle size: 70 to 100 nm), and MEK-ST-L (manufactured by Nissan Chemical Industries, Ltd., average primary particle size: 40 to 50 nm), commercially available colloidal silica dispersion liquids were used (concentration of solid contents: 30 mass %).

In the table, as the amounts of inorganic fine particles added, the amounts of dispersion liquids added are described.

As heat-sealing resins, among commercially available polyvinyl acetal resins, S-LEC KS10 (manufactured by SEKISUI CHEMICAL CO., LTD.) and S-LEC BL-5 (manufactured by SEKISUI CHEMICAL CO., LTD.) were used.

Formation 1 of Projection-Image-Displaying Laminate Films

Surfaces (on a side without being coated with the cholesteric liquid crystal) of the transparent supports of Half-mirror films A1 were coated with Heat-sealing-layer-forming coating solutions H1 to 14, using a wire bar, subsequently dried and heat-treated at 100° C. for 1 minute.

This provided Projection-image-displaying laminate films AH1 to 12 (Examples 1 to 12) and BH1 to 2 (Comparative Examples 1 and 2) each having, on a surface of the transparent support, a retardation layer and three cholesteric liquid crystal layers (selective reflection layer), and having, on the opposite surface of the cellulose acylate film, a heat-sealing layer having a thickness of 1.0 µm.

Surfaces (on a side without being coated with the cholesteric liquid crystal) of the transparent supports of Half-mirror films A1 were coated with Heat-sealing-layer-forming coating solution H5 using appropriately a wire bar and an applicator so as to form heat-sealing layers having dry thicknesses of 0.1 µm, 2.5 µm, 5 µm, 10 µm, 40 µm, and 100 µm, subsequently dried and heat-treated at 100° C. for 1 minute.

This provided Projection-image-displaying laminate films AH17 to 21 (Examples 13 to 17) and BH3 (Comparative Example 3) each having, on a surface of the transparent support, a retardation layer and three cholesteric liquid crystal layers (selective reflection layer) and having, on the opposite surface of the cellulose acylate film, a heat-sealing layer having a thickness of 0.1 µm, 2.5 µm, 5 µm, 10 µm, 40 µm, or 100 µm.

A surface (on a side without being coated with the cholesteric liquid crystal) of the transparent support of Half-mirror film A2 was coated with Heat-sealing-layer-forming coating solution H5 using a wire bar, subsequently dried and heat-treated at 100° C. for 1 minute.

This provided Projection-image-displaying laminate film AH13 (Example 18) having, on a surface of the transparent support, a retardation layer and three cholesteric liquid crystal layers (selective reflection layer) and having, on the opposite surface of the cellulose acylate film, a heat-sealing layer having a thickness of 1.0 µm.

A surface (on a side without being coated with the cholesteric liquid crystal) of the transparent support of Half-mirror film A3 was coated with Heat-sealing-layer-forming coating solution H5 using a wire bar, subsequently dried and heat-treated at 100° C. for 1 minute.

This provided Projection-image-displaying laminate film AH14 (Example 19) having, on a surface of the transparent support, a retardation layer and three cholesteric liquid crystal layers (selective reflection layer) and having, on the opposite surface of the cellulose acylate film, a heat-sealing layer having a thickness of 1.0 µm.

A surface (on a side without being coated with the cholesteric liquid crystal) of the transparent support of Half-mirror film A4 was coated with Heat-sealing-layer-forming coating solution H5 using a wire bar, subsequently dried and heat-treated at 100° C. for 1 minute.

This provided Projection-image-displaying laminate film BH4 (Comparative Example 4) having, on a surface of the transparent support, a retardation layer and three cholesteric liquid crystal layers (selective reflection layer) and having, on the opposite surface of the cellulose acylate film, a heat-sealing layer having a thickness of 1.0 μm.

A surface (on a side without being coated with the cholesteric liquid crystal) of the transparent support of Half-mirror film A5 was coated with Heat-sealing-layer-forming coating solution H5 using a wire bar, subsequently dried and heat-treated at 100° C. for 1 minute.

This provided Projection-image-displaying laminate film AH15 (Example 20) having, on a surface of the transparent support, a retardation layer and three cholesteric liquid crystal layers (selective reflection layer) and having, on the opposite surface of the cellulose acylate film, a heat-sealing layer having a thickness of 1.0 μm.

A surface (on a side without being coated with the cholesteric liquid crystal) of the transparent support of Half-mirror film A6 was coated with Heat-sealing-layer-forming coating solution H5 using a wire bar, subsequently dried and heat-treated at 100° C. for 1 minute.

This provided Projection-image-displaying laminate film AH16 (Example 21) having, on a surface of the transparent support, a retardation layer and three cholesteric liquid crystal layers (selective reflection layer) and having, on the opposite surface of the cellulose acylate film, a heat-sealing layer having a thickness of 1.0 μm.

A surface (on a side without being coated with the cholesteric liquid crystal) of the transparent support of Half-mirror film A7 was coated with Heat-sealing-layer-forming coating solution H5 using a wire bar, subsequently dried and heat-treated at 100° C. for 1 minute.

This provided Projection-image-displaying laminate film AH22 (Example 22) having, on a surface of the transparent support, a retardation layer and three cholesteric liquid crystal layers (selective reflection layers) and having, on the opposite surface of the cellulose acylate film, a heat-sealing layer having a thickness of 1.0 μm.

Production of Laminated Glasses

On convex curved glass plates having a length of 260 mm, a width of 330 mm, and a thickness of 2 mm, Projection-image-displaying laminate films AH1 to 22 and BH1 to 4 having a length of 220 and a width of 290 mm were placed, with the heat-sealing-layer-side surfaces facing downward, in the central areas of the glass plates. This formed laminates having the first glass plate, the heat-sealing layer, the transparent support, the retardation layer, and the selective reflection layer in this order.

On the laminates, a PVB film (intermediate film) having a length of 260 mm, a width of 330 mm, and a thickness of 0.38 mm and manufactured by SEKISUI CHEMICAL CO., LTD. was placed, and was furthermore overlain by a convex curved glass plate (second glass plate) having a length of 260 mm, a width of 330 mm, and a thickness of 2 mm. These were held at 90° C. under 10 kPa (0.1 atm) for 1 hour, heated in an autoclave (manufactured by KURIHARA SEI-SAKUSHO Co., Ltd.) at 140° C. at 1.3 Mpa (13 atm) for 60 minutes to remove air bubbles, to thereby provide Laminated glasses A to Z (Examples 1 to 22 and Comparative Examples 1 to 4).

These Laminated glasses A to Z have the same layer configuration as in the laminated glass illustrated in FIG. 3.

Measurement of Modulus of Elasticity

Samples of 10 mm×150 mm from Half-mirror films A1 to 7 were subjected to conditioning at 25° C. at a relative humidity of 60% for 2 hours or longer, and subsequently, using a universal tensile testing instrument "STM T50BP" manufactured by Toyo Baldwin Co., Ltd., measured for stress at a tensile speed of 10%/min at an elongation of 0.5% in an atmosphere at 25° C. and at 60RH %, to determine the modulus of elasticity.

Stiffness

The stiffness [N·mm] of Half-mirror films A1 to 7 was calculated, from the thickness d [μm] of such a half-mirror film and the modulus of elasticity a [MPa] determined in the above-described measurement, by the following formula.

$$\text{Stiffness} = \alpha \times (d/1000)^3$$

Measurement of Static Coefficient of Friction

A static coefficient of friction tester HEIDON-10 (manufactured by Shinto Scientific Co., Ltd.) was used to measure the static coefficient of friction between the heat-sealing-layer surface of a projection-image-displaying laminate film and a glass (flat glass produced by the float process (float glass)), and evaluation was performed on the basis of the following grades.

A: The static coefficient of friction is 0.8 or less.

B: The static coefficient of friction is more than 0.8 and 1.0 or less.

C: The static coefficient of friction is more than 1.0.

Evaluation of Stickiness (Tackiness) of Heat-Sealing Layer to Glass

Projection-image-displaying laminate films AH1 to 22 and BH1 to 4 were evaluated in terms of stickiness during bonding of a surface opposite from the liquid-crystal-layer-coated surface and a glass, on the basis of the following grades. The lower the stickiness, the higher the lubricity, the higher the handleability of the laminate during processing into the laminated glass, and the lower the probability of formation of wrinkles.

A: No stickiness at all.

B: Substantially no stickiness.

C: Strong stickiness.

Evaluation of Wrinkles

After processing into each laminated glass, whether or not wrinkles were formed in the laminate was visually evaluated on the basis of the following grades.

A: No formation of wrinkles at all.

B: No formation of fine wrinkles, but slight flapping observed.

C: Formation of fine wrinkles observed.

D: Large wavy wrinkles observed.

Evaluation of Screen-Image Visibility

For screen-image visibility, as illustrated in FIG. 4, p-polarized light was applied to the concave surface of each laminated glass, to project images; the distortion of the virtual images was evaluated in terms of image visibility on the basis of the following grades.

A: No distortion.

B: Substantially no distortion.

C: Slight distortion under a closer look, but no particular unnaturalness.

D: Distortion observed.

TABLE 3

| | Elements | | | | | | | Evaluation items (effects) | | | |
|---|---|---|---|---|---|---|---|---|---|---|---|
| | | Half-mirror film | | Heat-sealing layer of projection-image-displaying laminate film | | | | Half-mirror film | Heat-sealing-layer side of projection-image-displaying laminate film | | Laminated glass |
| | Laminated glass Type | Type | Film thickness [μm] | Type | Coating solution | Film thickness [μm] | Modulus of elasticity [MPa] | Stiffness [N·mm] | Static coefficient of friction | Stickiness | Wrinkles | Visibility |
| Example 1 | Laminated glass A | A1 | 48.2 | AH1 | H1 | 1 | 4740 | 0.53 | A | A | A | A |
| Example 2 | Laminated glass B | A1 | 48.2 | AH2 | H2 | 1 | 4740 | 0.53 | A | A | A | A |
| Example 3 | Laminated glass C | A1 | 48.2 | AH3 | H3 | 1 | 4740 | 0.53 | A | A | A | A |
| Example 4 | Laminated glass D | A1 | 48.2 | AH4 | H4 | 1 | 4740 | 0.53 | B | B | A | A |
| Example 5 | Laminated glass E | A1 | 48.2 | AH5 | H5 | 1 | 4740 | 0.53 | A | A | A | A |
| Example 6 | Laminated glass F | A1 | 48.2 | AH6 | H6 | 1 | 4740 | 0.53 | A | A | A | A |
| Example 7 | Laminated glass G | A1 | 48.2 | AH7 | H7 | 1 | 4740 | 0.53 | A | A | A | A |
| Example 8 | Laminated glass H | A1 | 48.2 | AH8 | H8 | 1 | 4740 | 0.53 | A | A | A | A |
| Example 9 | Laminated glass I | A1 | 48.2 | AH9 | H9 | 1 | 4740 | 0.53 | A | A | A | A |
| Example 10 | Laminated glass J | A1 | 48.2 | AH10 | H10 | 1 | 4740 | 0.53 | A | A | A | A |
| Example 11 | Laminated glass K | A1 | 48.2 | AH11 | H11 | 1 | 4740 | 0.53 | A | A | A | A |
| Example 12 | Laminated glass L | A1 | 48.2 | AH12 | H12 | 1 | 4740 | 0.53 | A | A | A | A |
| Example 13 | Laminated glass M | A1 | 48.2 | AH17 | H5 | 0.1 | 4740 | 0.53 | A | A | A | A |
| Example 14 | Laminated glass N | A1 | 48.2 | AH18 | H5 | 2.5 | 4740 | 0.53 | A | A | A | A |
| Example 15 | Laminated glass O | A1 | 48.2 | AH19 | H5 | 5 | 4740 | 0.53 | A | A | A | A |
| Example 16 | Laminated glass P | A1 | 48.2 | AH20 | H5 | 10 | 4740 | 0.53 | A | A | A | B |
| Example 17 | Laminated glass Q | A1 | 48.2 | AH21 | H5 | 40 | 4740 | 0.53 | A | A | A | C |
| Example 18 | Laminated glass R | A2 | 88.2 | AH13 | H5 | 1 | 4620 | 3.17 | A | A | B | C |
| Example 19 | Laminated glass S | A3 | 33.2 | AH14 | H5 | 1 | 4810 | 0.18 | A | A | A | A |
| Example 20 | Laminated glass T | A5 | 48.2 | AH15 | H5 | 1 | 4740 | 0.53 | A | A | A | A |
| Example 21 | Laminated glass U | A6 | 18 | AH16 | H5 | 1 | 2200 | 0.0128 | A | A | A | A |
| Example 22 | Laminated glass Z | A7 | 48.2 | AH22 | H5 | 1 | 4740 | 0.53 | A | A | A | A |
| Comparative Example 1 | Laminated glass V | A1 | 48.2 | BH1 | H13 | 1 | 4610 | 0.52 | C | C | C | D |
| Comparative Example 2 | Laminated glass W | A1 | 48.2 | BH2 | H14 | 1 | 4740 | 0.53 | C | C | C | D |
| Comparative Example 3 | Laminated glass X | A1 | 48.2 | BH3 | H5 | 100 | 4740 | 0.53 | A | A | A | D |
| Comparative Example 4 | Laminated glass Y | A4 | 107.7 | BH4 | H5 | 1 | 4610 | 5.76 | A | A | D | D |

In Laminated glasses A to U and Z (Examples 1 to 22), the heat-sealing layers had low static coefficients of friction with glasses, hence low stickiness, so that the laminated glasses had no noticeable wrinkles and considerable distortion was not observed for screen-image visibility. In Laminated glasses A to C (Examples 1 to 3) and E to U and Z (Examples 5 to 22), the heat-sealing layers had particularly low static coefficients of friction with glasses, hence the heat-sealing layers exerted good stickiness to glasses, so that improved handleability was provided during production of the laminated glasses, and further improvement was achieved in terms of wrinkles. Of these, though not being reflected in the evaluation, Laminated glass Z (Example 22) provided a particularly good result in terms of wrinkles due to heat-shrinkage of the cellulose acylate film. In Laminated glasses A to O (Examples 1 to 15), S to U (Examples 19 to 21), and Z (Example 22), the heat-sealing layers had very small film thicknesses and the half-mirror films also had small film thicknesses, so that better results were provided in terms of screen-image visibility.

In Laminated glasses V and W (Comparative Examples 1 and 2), the heat-sealing layers had high static coefficients of friction with glasses and caused high stickiness, so that the handleability was low during production of the laminated glasses, and wrinkles were formed.

In Laminated glass X (Comparative Example 3), the heat-sealing layer was thick, so that the virtual images distorted and the screen-image visibility was degraded.

In Laminated glass Y (Comparative Example 4), the half-mirror film had high stiffness and low conformability to the curved glass, so that, in the laminated glass, large wavy wrinkles were formed.

REFERENCE SIGNS LIST

1 transparent support
2 retardation layer
3 selective reflection layer
4 heat-sealing layer
5 intermediate film
6 first glass plate
7 second glass plate
10 half-mirror film
100 projector (p-polarized-light screen image)

What is claimed is:
1. A projection-image-displaying laminate film comprising a half-mirror film including a selective reflection layer configured to wavelength-selectively reflect light, and a heat-sealing layer disposed on one of surfaces of the half-mirror film,
wherein the half-mirror film has a stiffness at 25° C. of 4.0 N·mm or less, and
the heat-sealing layer has a thickness of 40 μm or less, contains a thermoplastic resin, and has a surface oppo- site from the half-mirror film, the surface having a static coefficient of friction with float glass of 1.0 or less.

2. The projection-image-displaying laminate film according to claim 1, wherein the half-mirror film has a stiffness of 1.0 N·mm or less.

3. The projection-image-displaying laminate film according to claim 1, wherein the heat-sealing layer has a thickness of 10 μm or less.

4. The projection-image-displaying laminate film according to claim 1, wherein the heat-sealing layer includes a polyvinyl acetal resin.

5. The projection-image-displaying laminate film according to claim 1, wherein the heat-sealing layer contains fine particles having an average primary particle size of 5 to 380 nm.

6. The projection-image-displaying laminate film according to claim 1, wherein the heat-sealing layer contains fine particles forming secondary particles that are aggregates of primary particles, and the primary particles have an average particle size of 5 to 50 nm, and the secondary particles have an average particle size of 50 to 380 nm.

7. The projection-image-displaying laminate film according to claim 5, wherein the heat-sealing layer contains 3 to 30 mass % of the fine particles.

8. A projection-image-displaying laminated glass, wherein a laminate including the projection-image-displaying laminate film according to claim 1 and an intermediate film adjacent to the selective reflection layer of the projection-image-displaying laminate film is sandwiched between two glass plates.

9. An image display system, wherein, onto the projection-image-displaying laminated glass according to claim 8, a screen image is projected from a light source configured to emit p-polarized light.

10. The projection-image-displaying laminate film according to claim 6, wherein the heat-sealing layer contains 3 to 30 mass % of the fine particles.

11. The projection-image-displaying laminate film according to claim 2, wherein the heat-sealing layer has a thickness of 10 μm or less.

12. The projection-image-displaying laminate film according to claim 2, wherein the heat-sealing layer contains fine particles having an average primary particle size of 5 to 380 nm.

13. The projection-image-displaying laminate film according to claim 2, wherein the heat-sealing layer contains fine particles forming secondary particles that are aggregates of primary particles, and the primary particles have an average particle size of 5 to 50 nm, and the secondary particles have an average particle size of 50 to 380 nm.

14. The projection-image-displaying laminate film according to claim 12, wherein the heat-sealing layer contains 3 to 30 mass % of the fine particles.

15. The projection-image-displaying laminate film according to claim 13, wherein the heat-sealing layer contains 3 to 30 mass % of the fine particles.

16. A projection-image-displaying laminated glass, wherein a laminate including the projection-image-displaying laminate film according to claim 2 and an intermediate film adjacent to the selective reflection layer of the projection-image-displaying laminate film is sandwiched between two glass plates.

17. An image display system, wherein, onto the projection-image-displaying laminated glass according to claim 16, a screen image is projected from a light source configured to emit p-polarized light.

18. The projection-image-displaying laminate film according to claim 3, wherein the heat-sealing layer contains fine particles having an average primary particle size of 5 to 380 nm.

19. The projection-image-displaying laminate film according to claim 3, wherein the heat-sealing layer contains fine particles forming secondary particles that are aggregates of primary particles, and the primary particles have an average particle size of 5 to 50 nm, and the secondary particles have an average particle size of 50 to 380 nm.

* * * * *